(12) United States Patent
Ikeno

(10) Patent No.: US 7,395,307 B2
(45) Date of Patent: Jul. 1, 2008

(54) CARRY LOOK-AHEAD CIRCUIT AND ADDER USING SAME

(75) Inventor: Rimon Ikeno, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 809 days.

(21) Appl. No.: 10/791,939

(22) Filed: Mar. 2, 2004

(65) Prior Publication Data

US 2004/0236816 A1    Nov. 25, 2004

(30) Foreign Application Priority Data

Mar. 3, 2003    (JP)    ............................. 2003-055763

(51) Int. Cl.
*G06F 7/50*    (2006.01)

(52) U.S. Cl. ..................................... 708/710

(58) Field of Classification Search ................. 708/710, 708/711, 712
See application file for complete search history.

(56) References Cited

U.S. PATENT DOCUMENTS

| | | | |
|---|---|---|---|
| 4,559,608 A * | 12/1985 | Young et al. | 708/702 |
| 5,122,982 A | 6/1992 | Cohn | |
| 5,278,783 A * | 1/1994 | Edmondson | 708/711 |
| 5,877,973 A | 3/1999 | Kato et al. | |
| 6,199,090 B1 * | 3/2001 | Mansingh et al. | 708/672 |

* cited by examiner

*Primary Examiner*—Chuong D Ngo
(74) *Attorney, Agent, or Firm*—Robert D. Marshall, Jr.; W. James Brady; Frederick J. Telecky, Jr.

(57) ABSTRACT

A carry look-ahead circuit for an adder to decrease circuit size and power consumption. The carry look-ahead circuit is composed of 2-input NAND gates 101, 102, 2-input NOR gate 103, AND-NOR type composite gates 201, 202, OR-NAND type composite gate 251, or other gates with 2 or less series stages of transistors inserted between the output terminal and the power source line or the ground line. When the number of series stages of transistors increases, the driving power decreases. Consequently, in order to maintain the same operation speed, it is necessary to increase the transistor size. The use of multi-input NAND gates and NOR gates, makes it possible to suppress the number of series stages of transistors and to reduce the transistor size. As a result, it is possible to decrease the circuit size and power consumption.

35 Claims, 11 Drawing Sheets

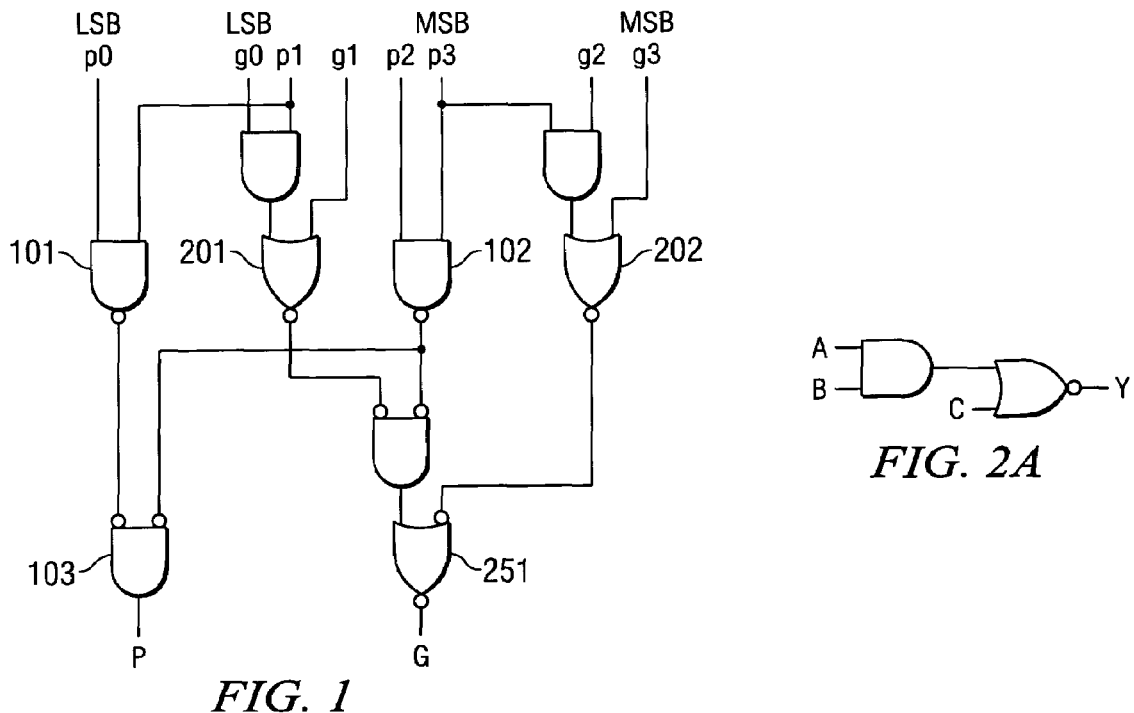
*FIG. 1*
*FIG. 2A*
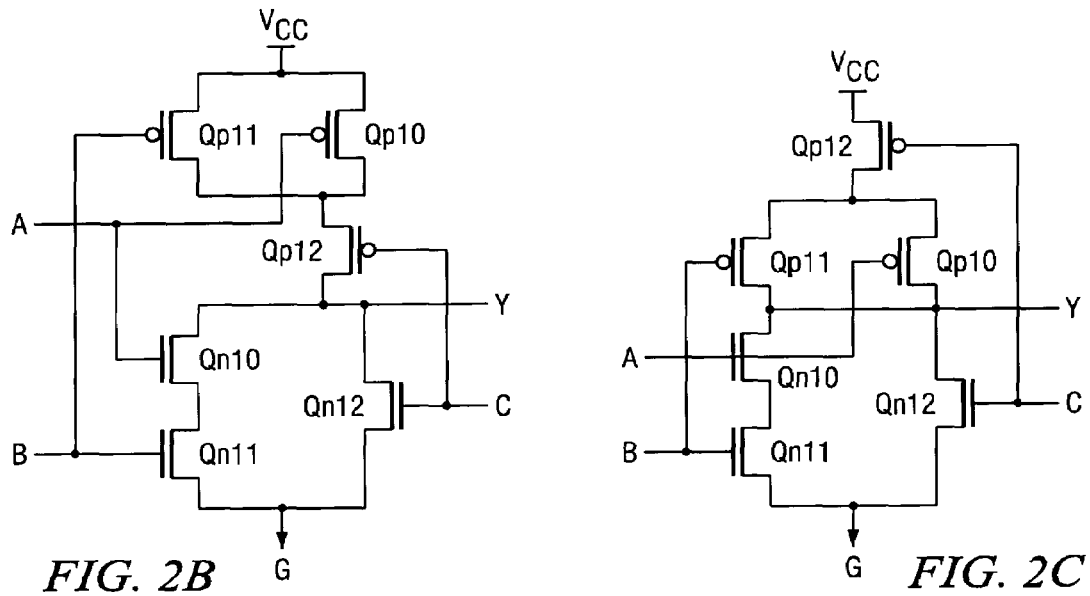
*FIG. 2B*  *FIG. 2C*
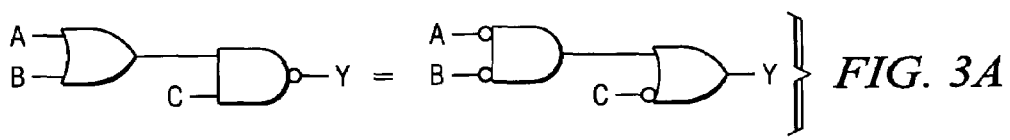
*FIG. 3A*

1- BIT HALF ADDER $p = a \oplus b$
$g = a \cdot b$

CARRY LOOK-AHEAD CIRCUIT AND ADDER USING SAME

FIELD OF THE INVENTION

This invention pertains to a type of carry look-ahead circuit for high-speed generation of a carry signal in an adder. This invention also pertains to a type of adder using said carry look-ahead circuit.

BACKGROUND OF THE INVENTION

When an adder is formed, the most important factor related to the efforts to increase the operation speed is the delay in propagation of the carry signal. For example, in a ripple carry type adder, because the carry signal is propagated sequentially from the least significant position to the most significant position, a delay time is generated proportional to the bit length of the addition object signal until the operation result and overflow of the most significant position are determined.

FIG. 16A is a circuit diagram illustrating an example of constitution of a ripple carry type adder that adds 4-bit signals. The ripple carry type adder shown in FIG. 16A is composed of four full adders (1)-(4).

Full adders (1)-(4) take 1-bit carry signal $C_1$ of from the lower position as input, and at the same time, have 1-bit signals a and b as addition objects as inputs. Then, each of the full adders outputs 1-bit signal s as the addition result, and at the same time, outputs 1-bit carry signal $c_0$ to the upper position. Addition result signal s and carry signal $c_0$ are expressed by the following equations, respectively.

[Numerical Formula 1]

$$s = a \oplus b \oplus c_1 \quad (1)$$

$$c_0 = a \cdot b + (a \oplus b) \cdot c_1 \quad (2)$$

The signals of the various positions of the addition object signals are input to full adders (1)-(4) shown in FIG. 16B. That is, in a corresponding order, the least significant position $(a_0, b_0), \ldots$, and finally, the most significant position $(a_3, b_3)$ are input to full adders $(1), \ldots, (4)$, respectively. Also, for each of full adders (1)-(4), the carry signal is input from the lower-position full adder. That is, carry signal $c_{in}$ from the exterior is input to full adder (1). Carry signal $c_0$ from full adder (1) is input to full adder (2). Carry signal $c_1$ from full adder (2) is input to full adder (3). Carry signal $c_2$ from full adder (3) is input to full adder (4). Signals $s_0$-$s_3$ as addition results output from full adders (1)-(4) correspond to the least significant position-most significant position of the 4-bit addition results. The carry signal output from full adder (4) shows overflow in the 4-bit addition result.

In the adder with the constitution shown in FIG. 16A, before output of lower-position carry signal $c_2$, the addition result $s_3$ of the most significant position and its overflow signal $c_3$ are not determined. Also, the carry signal $c_2$ is not determined until output of the lower-position carry signal $c_1$, and carry signal $c_1$ is not determined until output of the lower-position carry signal $c_0$.

That is, in order to determine the addition result and carry for a certain position, it is necessary to determine the carry signals of all the positions lower than the position. Consequently, the propagation path of the carry signal (indicated by broken line in FIG. 16A) becomes the longest delay path (critical path) in the ripple type adder. As the bit length of the addition object signals increases, the number of stages of full adders that have to be added increases. All these added full adders are added to the critical path. Consequently, the delay time before the final addition result can be determined increases.

As a method for alleviating the delay in propagation of the carry signal, a scheme has been proposed in which a carry look-ahead circuit is used. In this scheme, the least significant position of the addition object signal is taken as the first position, and carry signal $c_i$ formed due to addition of the $(i+1)$th position (where, i is a positive integer including zero) has the following relationship, which is exploited to detect the carry of the upper position without waiting for detection of the lower-position carry.

[Numerical Formula 2]

$$\begin{aligned} c_i &= p'_i c_{i-1} + g_i \quad (3)\\ &= p'_i p'_{i-1} \cdots 'p'_1 g_0 + \\ &\quad p'_i p'_{i-1} \cdots 'p'_2 g_1 + \\ &\quad \vdots \\ &\quad p'_i g_{i-1} + \\ &\quad g_i \end{aligned}$$

In Equation (3), using signals $(a_i, b_i)$ of the $(i+1)$th position of the addition object signals, signals $p_i$ and $g_i$ can be expressed by the following equations.

[Numerical Formula 3]

$$p_i = a_i \oplus b_i \quad (4)$$

$$g_i = a_i \cdot b_i \quad (5)$$

Usually, signal $p_i$ is known as a carry propagation signal, and signal $g_i$ is known as a carry generation signal. Also, in Equation (3), carry signal $c_{-1}$ is set at "0", that is, it is assumed that no carry input exists from the exterior with respect to the first position of the addition object signals. On the other hand, when external carry signal $c_{in}$ exists, carry signal $c_i$ is expressed by the following equation.

[Numerical Formula 4]

$$\begin{aligned} c_i &= p'_i p'_{i-1} \cdots 'p'_o c_{in} + \quad (3A)\\ &\quad p'_i p'_{i-1} \cdots 'p'_1 g_0 + \\ &\quad p'_i p'_{i-1} \cdots 'p'_2 g_1 + \\ &\quad \vdots \\ &\quad p'_i g_{i-1} + \\ &\quad g_i \end{aligned}$$

For example, if no external carry signal $c_{in}$ exists, by means of Equation (3) carry signal $c_3$ from the most significant position ($4^{th}$ position) in the 4-bit adder can be expressed by the following equation.

[Numerical Formula 5]

$$\begin{aligned} c3 &= p3 \cdot p2 \cdot p1 \cdot g0 + \quad (6)\\ &\quad p3 \cdot p2 \cdot g1 + \end{aligned}$$

-continued $$p3 \cdot g2 +$$
$$g3$$

FIG. 17A is a circuit diagram illustrating an example of the generation circuit of carry signal $c_3$ formed according to the relationship of Equation (6). The generation circuit of carry signal $c_3$ shown in FIG. 17A has half adders (5)-(8), each of which is shown in FIG. 17B, 4-input NAND gates (9) and (13), 3-input NAND gate (10), 2-input NAND gate (11), and inverter (12). Half adders (5)-(8) take the addition object signals of the various positions as inputs, perform exclusive OR expressed by Equation (4) and AND expressed by Equation (5), and output a carry propagation signal and carry generation signal. That is, corresponding to the order, half adders (5), . . . , (8) have the least significant position ($a_0$, $b_0$), . . . , and most significant position ($a_3$, $b_3$) of the addition object 4-bit signals as inputs, respectively. Then, for the input addition object signals, exclusive OR and AND are performed, and then carry propagation signal/carry generation signal groups ($p_0$, $g_0$), . . . , ($p_3$, $g_3$) are output, respectively.

The 4-input NAND gate (9) takes carry generation signal $g_0$ from half adder (5) and carry propagation signals $p_1$-$p_3$ output from half adders (6)-(8) as inputs, and outputs NAND of the four input signals. This output signal corresponds to the NOT signal of the first item on the right side of Equation (6). The 3-input NAND gate (10) takes carry generation signal $g_1$ from half adder (6) and carry propagation signals $p_2$ and $p_3$ output from half adders (7) and (8) as inputs, and outputs NAND of the three input signals. This output signal corresponds to the NOT signal of the second item on the right side of Equation (6). The 2-input NAND gate (11) takes carry generation signal $g_2$ from half adder (7) and carry propagation signal $p_3$ output from half adder (8) as inputs, and outputs NAND of the two input signals. This output signal corresponds to the NOT signal of the third item on the right side of Equation (6). Inverter (12) outputs NOT of carry generation signal $g_3$ output from half adder (8). This output signal corresponds to the signal of NOT of the fourth item on the right side of Equation (6). The 4-input NAND gate (13) takes the output signals of NAND gates (9)-(11) and inverter (12) as its inputs, and outputs NAND of the input four signals. This output signal corresponds to carry signal $c_3$ shown in Equation (6).

With the aid of the generation circuit of carry signal $c_3$ with the constitution, carry signal $c_3$ can be formed directly from addition object signals ($a_0$, . . . , $a_3$) and ($b_0$, . . . , $b_3$), without waiting for determination of the lower-position carry signals ($c_0$-$c_2$). Compared with the ripple carry system shown in FIG. 16A, the delay in propagation of the carry signal can be shortened. The circuit shown in FIG. 17A is a circuit for forming the carry signal for the $4^{th}$ position counted from the least significant position. When a carry signal is to be formed for addition of more bits, one usually adopts a system in which plural CLA circuits are connected in a hierarchical constitution.

FIG. 18 is a circuit diagram illustrating an example of the generation circuit of carry signal $c_{15}$ composed of plural CLA circuits connected in a hierarchical constitution. The generation circuit of carry signal $c_{15}$ shown in FIG. 18 has 4-bit half adders (21)-(24) and CLA circuits (25)-(29). 4-bit half adders (21)-(24) have the 4-bit signals obtained by dividing the 16-bit addition object signals into four portions as inputs, and they operate using Equations (4) and (5) to get a carry propagation signal and carry generation signal respectively, for the various positions. That is, half adder (21) has the addition object signals ($a_0$, . . . , $a_3$) and ($b_0$, . . . , $b_3$) of the least significant position (first position)-fourth position as inputs. Half adder (22) has the addition object signals ($a_4$, . . . , $a_7$) and ($b_4$, . . . , $b_7$) of the fifth-eighth positions as inputs. Half adder (23) has the addition object signals ($a_8$, . . . , $a_{11}$) and ($b_8$, . . . , $b_{11}$) of the ninth-$12^{th}$ positions as inputs. Half adder (24) has the addition object signals ($a_{12}$, . . . , $a_{15}$) and ($b_{12}$, . . . , $b_{15}$) of the $13^{th}$-$16^{th}$ positions as inputs.

For each position of the input addition object signals, exclusive OR according to Equation (4) and AND according to Equation (5) are determined in operation. Half adder (21) calculates and outputs carry propagation signal ($p_0$, . . . , $p_3$) and carry generation signal ($g_0$, . . . , $g_3$). Half adder (22) calculates and outputs carry propagation signal ($p_4$, . . . , $p_7$) and carry generation signal ($g_4$, . . . , $g_7$). Half adder (23) calculates and outputs carry propagation signal ($p_8$, . . . , $p_{11}$) and carry generation signal ($g_8$, . . . , $g_{11}$). Half adder (24) calculates and outputs carry propagation signal ($p_{12}$, . . . $p_{15}$) and carry generation signal ($g_{12}$, . . . , $g_{15}$).

FIG. 19 is a circuit diagram illustrating an example of constitution of 4-bit half adder (21). For example, as shown in FIG. 19, the 4-bit half adder (21) is composed of four half adders (30)-(33) of 1-bit half adders. Also, other 4-bit half adders (22)-(24) may have the same constitution as that shown in FIG. 19. CLA circuits (25)-(28) have carry propagation 4-bit signals and carry generation 4-bit signals output from 4-bit half adders (21)-(24) as inputs, respectively, and, corresponding to these signals, they output carry propagation 1-bit signals and carry generation 1-bit signals, respectively.

That is, CLA circuit (25) has carry propagation signal ($p_0$, . . . , $p_3$) and carry generation signal ($g_0$, . . . , $g_3$) of half adder (21) input to it. CLA circuit (26) has carry propagation signal ($p_4$, . . . , $p_7$) and carry generation signal ($g_4$, . . . , $g_7$) of half adder (22) input to it. CLA circuit (27) has carry propagation signal ($p_8$, . . . , $p_{11}$) and carry generation signal ($g_8$, . . . , $g_{11}$) of half adder (23) input to it. CLA circuit (28) has carry propagation signal ($p_{12}$, . . . , $p_{15}$) and carry generation signal ($g_{12}$, . . . , $g_{15}$) of half adder (24) input to it. Then, corresponding to the inputs, carry propagation 1-bit signals and carry generation 1-bit signals are calculated. That is, CLA circuit (25) calculates and outputs carry propagation signal $P_0$ and carry generation signal $G_0$. CLA circuit (26) calculates and outputs carry propagation signal $P_1$ and carry generation signal $G_1$. CLA circuit (27) calculates and outputs carry propagation signal $P_2$ and carry generation signal $G_2$. CLA circuit (28) calculates and outputs carry propagation signal $P_3$ and carry generation signal $G_3$. The input carry propagation 4-bit signals for CLA circuits (25)-(28) are represented as signals $p_{(0)}$-$p_{(3)}$ from the lower position, also, the input carry generation 4-bit signals are represented as signals $g_{(0)}$-$g_{(3)}$. In this case, output 1-bit carry propagation signal P and output 1-bit carry generation signal G are expressed by the following equations.

[Numerical Formula]

$$G = p'_{(3)} p'_{(2)} p'_{(1)} g_{(0)} + \qquad (7)$$
$$p'_{(3)} p'_{(2)} g_{(1)} +$$
$$p'_{(3)} g_{(2)} +$$
$$g_{(3)}$$

$$P = p'_{(3)} p'_{(2)} p'_{(1)} p_{(0)} \qquad (8)$$

FIG. 20 is a circuit diagram illustrating an example of the constitution of CLA circuit (25). Circuits (14)-(18) generating output carry generation signal $G_0$ in CLA circuit (25) are identical to circuits (9)-(13) generating carry signal $c_3$ shown in FIG. 17. Also, generation of carry propagation signal $P_0$ is realized by performing operation of NAND for carry propagation signals $p_0$-$p_3$ in 4-input NAND gate (19), followed by NOT of the operation result with inverter (20). Other CLA circuits (25)-(28) may also have the same circuit constitution as that shown in FIG. 20. CLA circuit (29) takes output 4-bit carry propagation signal ($P_0, \ldots, P_3$) and output 4-bit carry generation signal ($G_0, \ldots, G_3$) from CLA circuits (26)-(28) as inputs, and corresponding to them, it outputs 1-bit carry propagation signal Po and 1-bit carry generation signal Go. For CLA circuit (29), output carry generation signal Go and output carry propagation signal Po are calculated in the same way as in CLA circuits (25)-(28) by just replacing input carry propagation signal ($p_{(0)}, \ldots, p_{(3)}$) and input carry generation signal ($g_{(0)}, \ldots, g_{(3)}$) with output carry propagation signal ($P_0, \ldots, P_3$) and output carry generation signal ($G_0, \ldots, G_3$) of CLA circuits (25)-(28) in Equations (7) and (8). Consequently, the circuit constitution of CLA circuit (29) can be realized in the same way as in FIG. 20.

In the generation circuit of carry signal $c_{15}$ with the constitution, when i=15 in the Equation (3), output carry generation signal Go of CLA circuit (29) is equal to carry signal $c_{15}$. That is, using Equation (3), carry signal $c_{15}$ is expressed by the following equation.

[Numerical Formula 7]

$$C_{15} = p'_{15} p'_{14} \cdots 'p'_1 g_o + \quad (9)$$
$$p'_{15} p'_{14} \cdots 'p'_2 g_1 +$$
$$p'_{15} g_{14} +$$
$$g_{15}$$

Output carry propagation signals $P_1$-$P_3$ of CLA circuits (26)-(28) and output carry generation signal $G_0$ of CLA circuit (25) are expressed by the following equations.

[Numerical Formula 8]

$$P_3 = p_{15} \cdot p_{14} \cdot p_{13} \cdot p_{12} \quad (10A)$$
$$P_2 = p_{11} \cdot p_{10} \cdot p_9 \cdot p_8 \quad (10B)$$
$$P_1 = p_7 \cdot p_6 \cdot p_5 \cdot p_4 \quad (10C)$$
$$G_0 = p_3 \cdot p_2 \cdot p_1 \cdot g_0 + \quad (10D)$$
$$p_3 \cdot p_2 \cdot g_1 +$$
$$p_3 \cdot g_2 +$$
$$g_3$$

By substituting Equations (10A)-(10D) into items 1-4 on the right side of Equation (9), one can represent OR $W_{14}$ of items 1-4 by the following equation.

[Numerical Formula 9]

$$W_{14} = P_3 \cdot P_2 \cdot P_1 \cdot p_3 \cdot p_2 \cdot p_1 \cdot g_0 + \quad (11)$$
$$P_3 \cdot P_2 \cdot P_1 \cdot p_3 \cdot p_2 \cdot g_1 +$$

-continued
$$P_3 \cdot P_2 \cdot P_1 \cdot p_3 \cdot g_2 +$$
$$P_3 \cdot P_2 \cdot P_1 \cdot g_3 +$$
$$= P_3 \cdot P_2 \cdot P_1 \cdot G_0$$

OR of items 5-8, items 9-12, and items 13-16 on the right side of Equation (9), just as OR $W_{14}$ of Equation (11), may also be represented with the output carry propagation signals and output carry generation signals of CLA circuits (25)-(28). As a result, carry signal $c_{15}$ is expressed by the following equation.

[Numerical Formula 10]

$$C_{15} = P_3 \cdot P_2 \cdot P_1 \cdot G_o + \quad (9A)$$
$$P_3 \cdot P_2 \cdot G_1 +$$
$$P_3 \cdot G_2 +$$
$$G_3$$

The right side of Equation (9A) is equal to output carry generation signal Go of CLA circuit (29). From this fact, one can see that output carry generation signal Go becomes equal to carry signal $c_{15}$. The circuit shown in FIG. 18 is a CLA circuit that takes a 4-bit carry propagation signal and a 4-bit carry generation signal as inputs, and outputs a carry propagation 1-bit signal and carry generation 1-bit signal. Usually, for a CLA circuit that takes an N-bit carry propagation signal and an N-bit carry generation signal, output carry propagation signal P and output carry generation signal G are expressed by the following equation.

[Numerical Formula 11]

$$G = p'_{(N-1)} p'_{(N-2)} \cdots 'p'_{(1)} g_{(0)} + \quad (12)$$
$$p'_{(N-1)} p'_{(N-2)} \cdots 'p'_{(2)} g_{(1)} +$$
$$\vdots$$
$$p'_{(N-1)} g_{(N-1)} +$$
$$g_{(N-1)}$$
$$P = p'_{(N-1)} p'_{(N-2)} \cdots p'_{(1)} p_{(0)} \quad (13)$$

For example, for a carry look-ahead circuit made of plural CLA circuits connected in hierarchical constitution, the technology described in Patent Reference 1 is available.

For the CLA circuit used in the generation circuit of a carry signal shown in FIGS. 17 and 18, NANDs having plural inputs, such as 3 inputs and 4 inputs, are used. Usually, in a NAND gate, NOR gate, and other gates, the larger the input signal number, the larger the number of series stages of transistors inserted between the output terminal and the power source line or the ground line. For example, for a 4-input NAND gate, 4 stages of transistors are inserted in series between the output terminal and the ground line. Consequently, for a gate having plural inputs, the driving ability of the output current decreases, and the operation speed tends to decrease.

In order to suppress decrease in the speed of a multi-input gate, it is necessary to increase the size or gate width of the transistors so as to decrease the ON resistance. As a result, the circuit size increases, and due to an increase in gate capacitance, the driving loss of transistors increases. This is undesirable. However, because the generation circuit of the carry signal is the critical path of the entire adder, in order to improve the overall performance of the adder, it is necessary to increase the area of the transistors used in the plural input gates of the CLA circuit. Consequently, in a conventional CLA circuit, as a cost in increasing the operation speed of the adder, the circuit size and power consumption increase, and this is always a problem.

FIG. 5 in Japanese Kokai Patent Application No. Hei 5[1993]-61643 is a circuit diagram illustrating an example in which composite gates are used in a CLA circuit that generates the same signal as that of output carry generation signal G expressed by Equation (7). FIG. 21 is a circuit diagram illustrating an example of a CLA circuit made of the composite gates. For the composite gate shown in FIG. 21, four transistors, that is, p-type MOS transistors Qp1-Qp4, are inserted in series between the input terminal of inverter (34) and power source line $V_{cc}$, and four transistors, that is, n-type MOS transistors Qn1-Qn4, are inserted in series between the input terminal of inverter (34) and ground line G. Consequently, in order to increase the speed of the CLA circuit, it is necessary to increase the size of these transistors, and as explained above, problems of increase in circuit size and power consumption occur. This is undesirable.

SUMMARY OF THE INVENTION

A general object of this invention is to solve the problems of conventional methods by providing a type of carry look-ahead circuit and adder which has reduced can circuit size and power consumption.

This and other objects and features are attained, in accordance with one aspect of the present invention by a carry look-ahead circuit comprising one or several first logic gates that output AND, NAND, OR or NOR of input 2-bit signals, and one or several second logic gates that output OR or NOR of AND of 2-bit signals among input 3-bit signals and the other 1-bit signal, or AND or NAND of OR of 2-bit signals among input 3-bit signals and the other 1-bit signal.

Another aspect of the invention provides a carry look-ahead circuit that is composed of one or several first logic gates that output AND, NAND, OR or NOR of input 2-bit signals, one or several second logic gates that output OR or NOR of AND of 2-bit signals among input 3-bit signals and the other 1-bit signal, or AND or NAND of OR of 2-bit signals among input 3-bit signals and the other 1-bit signal, and one or several third logic gates that output NOT of a 1-bit input.

A further aspect of this invention provides a carry look-ahead circuit having the carry look-ahead circuit output a carry generation signal corresponding to the result of OR operation from the first logic operation item to the Nth logic operation item for the (k−1)th logic operation item and Nth logic operation item; here, the (k−1)th logic operation item is equal to AND of the various positions from the Nth position to the kth position (where k is a natural number in the range of 2−N) of the input carry propagation signal and the (k−1)th position of the input carry generation signal, with the least significant position of the input (N−1)-bit carry propagation signal (where N is a natural number) taken as the second position and the least significant position of the N-bit carry generation signal taken as the first position, and the Nth logic operation item is equal to the Nth position of the output carry generation signal; the carry look-ahead circuit has the following logic gates: one or several first logic gates that perform the following operation: in the OR operation formula of N items with the first logic operation item through Nth logic operation item set side-by-side, grouping is performed with OR for every two adjacent items taken as a group item in the order from the side of the first logic operation item to the side of the Nth logic operation item; when a common item exists in the two grouped items, OR of the two items in the group item is transformed to AND of the common item and non-common item; when the number of the group items in the OR operation formula after the grouping is larger than 2, the grouping and the transformation are carried out repeatedly for the group items in the order corresponding to the number order in the OR operation formula after the grouping; the OR operation formula made of two the group items obtained in the above process is taken as the first logic formula; among the signals corresponding to AND, NAND, OR or NOR of the input carry propagation signals of plural bits, the input carry propagation signal, and the input carry generation signal, 2-bit signals are input, and AND, NAND, OR or NOR of the input 2-bit signals is output from the one or several first logic gates; and one or several second logic gates that perform the following operation: among the signals corresponding to the operation result for the group item, the common item, and the non-common item in the first logic formula, as well as the input carry generation signal, the input carry propagation signal, and the output signal of the first logic gates, 3-bit signals are input; among the input signals, the signal corresponding to OR or NOR of AND of the 2-bit signals and the other 1-bit signal, or the signal corresponding to AND or NAND of OR of the 2-bit signals among the input signals and the other 1-bit signal is output as the signal corresponding to the operation result (or its NOT) for the group item, the non-common item, or the output carry generation signal; The position that is one position lower than the second position of the input carry propagation signal is taken as the first position; the first logic gate may also contain a logic gate that has the signal of the first position of the input carry propagation signal input to it as a 1-bit signal among the input 2-bit signals, and a logic gate that outputs the carry propagation signal (or its NOT) corresponding to the result of operation for AND for the various positions from the first position to the Nth position of the input carry propagation signal. Also, it may contain one or several third logic gates which take a 1-bit signal among the input carry generation signal, the input carry propagation signal, the output signal of the first logic gate, and the output signal of the second logic gate as input, perform NOT for the input signal, and output the result to the first logic gate or the second logic gate, or which output [same] as the output carry propagation signal or the output carry generation signal.

Another aspect this invention provides an adder having the following circuits: a first logic operation circuit, which outputs exclusive OR of the various positions of two addition object signals as the carry propagation signal, and which outputs AND of the various positions of the two addition object signals as the carry generation signal; a second logic operation circuit, which performs a carry operation for each position generated due to addition of the addition object signals corresponding to the carry propagation signal and the carry generation signal of the first logic operation circuit, and which outputs the operation result as the carry signal; and a third logic operation circuit, which performs exclusive OR for the carry signal from the lower position with respect to each position of the addition object signal and the carry propagation signal for each position, and which outputs the operation result as the result of addition of each position; the second logic operation circuit contains one or several carry look-ahead circuits, which take the carry propagation signals of plural bits and the carry generation signals of plural bits output from the first logic operation circuit as input, and which outputs an output carry propagation 1-bit signal and an output carry generation 1-bit signal, and a carry signal output circuit that outputs the carry signal corresponding to the carry propagation signal and the carry generation signal of the first logic operation circuit as well as the output carry propagation signal and the output carry generation signal of the carry look-ahead circuit; the carry look-ahead circuit comprises the carry look-ahead circuit outputs the output carry generation signal corresponding to the result of OR operation from the first logic operation item to the Nth logic operation item for the (k−1)th logic operation item and Nth logic operation item; here, the (k−1)th logic operation item is equal to AND of the various positions from the Nth position to the kth position (where k is a natural number in the range of 2−N) of the input carry propagation signal and the (k−1)th position of the input carry generation signal; with the least significant position of the N-bit carry propagation signal (where N is a natural number) input from the first logic operation circuit and the least significant position of the N-bit carry generation signal as the first positions, respectively, and the carry look-ahead circuit outputs the output carry propagation signal corresponding to the result of operation for AND of the various positions from the first position to the Nth position of the input carry propagation signal; the carry look-ahead circuit has the following logic gates: one or several first logic gates that perform the following operation: in the OR operation formula of N items with the first logic operation item through Nth logic operation item set side-by-side, grouping is performed with OR for every two adjacent items taken as a group item in the order from the side of the first logic operation item to the side of the Nth logic operation item; when a common item exists in the two grouped items, OR of the two items in the group item is transformed to AND of the common item and non-common item; when the number of the group items in the OR operation formula after the grouping is larger than 2, the grouping and the transformation are carried out repeatedly for the group items in the order corresponding to the number order in the OR operation formula after the grouping; the OR operation formula made of two the group items obtained in the above process is taken as the first logic formula; among the signals corresponding to AND, NAND, OR or NOR of the input carry propagation signals of plural bits, the input carry propagation signal, and the input carry generation signal, 2-bit signals are input, and AND, NAND, OR or NOR of the input 2-bit signals is output from the one or several first logic gates; and one or several second logic gates that perform the following operation: among the signals corresponding to the operation result of the group item, the common item, and the non-common item in the first logic formula, as well as the input carry generation signal, the input carry propagation signal, and the output signal of the first logic gates, 3-bit signals are input; among the input signals, the signal corresponding to OR or NOR of AND of 2-bit signals and the other 1-bit signal, or the signal corresponding to AND or NAND of OR of 2-bit signals among the input signals and the other 1-bit signal is output as the signal corresponding to the operation result (or its NOT) of the group item, the non-common item, or the output carry generation signal.

BRIEF DESCRIPTION OF THE DRAWINGS

FIG. 1 is a circuit diagram illustrating an example of the constitution of the 4-bit CLA circuit in Embodiment 1 of this invention.

FIG. 2 is a circuit diagram illustrating two structural examples of an AND-NOR type composite gate.

REFERENCE NUMERALS AND SYMBOLS AS SHOWN IN THE DRAWINGS

Figure 3B:
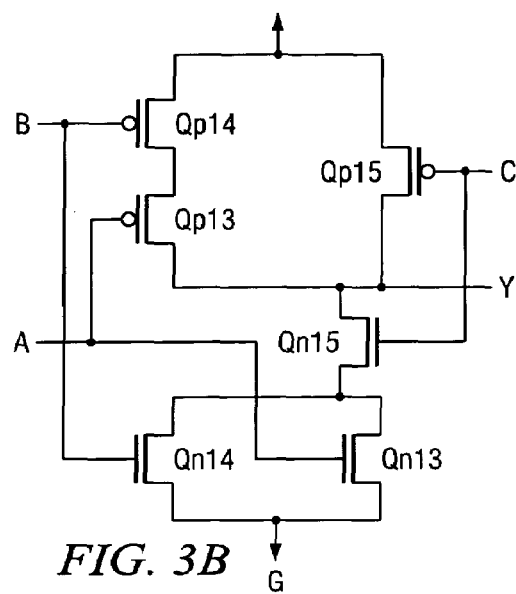
FIG. 3 is a circuit diagram illustrating two structural examples of an OR-NAND type composite gate.

In the Figures, 101-134 represents an NAND gate or NOR gate, 135-138 an EXOR gate, 201-228 an AND-NOR type composite gate, 251-259 an OR-NAND type composite gate, 301-331 an inverter, 401-404 a 4-bit half adder, 501-504, 507 a 4-bit CLA circuit, 505 a 2-bit CLA circuit, 506 a 3-bit CLA circuit, 601-604 a 1-bit carry output circuit, 605-608 a 3-bit carry output circuit, 701-704 an addition result output circuit, $Qn10$-$Qn15$ an n-type MOS transistor, $Qp10$-$Qp15$ a p-type MOS transistor.

DESCRIPTION OF THE EMBODIMENTS

Embodiment 1

In the following, a 4-bit CLA circuit pertaining to Embodiment 1 of this invention will be explained. The 4-bit CLA circuit has the 4-bit carry propagation signal ($p_0, \ldots, p_3$) and 4-bit carry generation signal ($g_0, \ldots, g_3$) as inputs, and, corresponding to the input signals, it outputs 1-bit carry propagation signal P and 1-bit carry generation signal G. The least significant position (the first position), ..., and the most significant position (the fourth position) of the 4-bit carry propagation signal correspond to carry propagation signals $p_0, \ldots, p_3$, respectively. Also, the least significant position (the first position), ..., and the most significant position (the fourth position) of the 4-bit carry generation signal correspond to carry generation signals $g_0, \ldots, g_3$, respectively. Using carry propagation signal ($p_0, \ldots, p_3$) and carry generation signal ($g_0, \ldots, g_3$), carry propagation signal P and carry generation signal G can be expressed by the following equations.

[Numerical Formula 12]

$$G = p_3 \cdot p_2 \cdot p_1 \cdot g_0 + p_3 \cdot p_2 \cdot g_1 + p_3 \cdot g_2 + g_3 \qquad (14)$$

$$P = p_3 \cdot p_2 \cdot p_1 \cdot p_0 \qquad (15)$$

If AND of the fourth position to second position of the input carry propagation signal and the first position of the input carry generation signal is taken as the first logic operation item, this first logic operation item corresponds to the first item ($p_3 \cdot p_2 \cdot p_1 \cdot g_0$) on the right side of Equation (14). If AND of the fourth position to third position of the input carry propagation signal and the second position of the input carry generation signal is taken as the second logic operation item, this second logic operation item corresponds to the second item ($p_3 \cdot p_2 \cdot g_1$) on the right side of Equation (14). If AND of the fourth position of the input carry propagation signal and the third position of the input carry generation signal is taken as the third logic operation item, this third logic operation item corresponds to the third item ($p_3 \cdot g_2$) on the right side of Equation (14). If the fourth position of the input carry generation signal is taken as the fourth logic operation item, this fourth logic operation item corresponds to the fourth item ($g_3$) on the right side of Equation (14). Consequently, carry generation signal G output from the 4-bit CLA circuit is given as a result of the operation of OR of the four items (first logic operation item-fourth logic operation item).

Here, for the Equation (14), the following transformation is performed. Equation (14) is a formula of operation of OR of the four items, that is, the first logic operation item through the fourth logic operation item set side-by-side in numerical order. First of all, for the Equation (14), grouping is performed with OR for every adjacent two items taken as a group item in the order from the first logic operation item or the fourth logic operation item, that is, from the left side or right side of the equation in a sequential way. Then, when a common item exists in the two grouped items, OR of the two items in the group items is transformed to AND of the common item and non-common item.

The following is the equation representing the operation of OR after the grouping and transformation.

[Numerical Formula 13]

$$G = (p_3 \cdot p_2) \cdot (p_1 \cdot g_0 + g_1) + (p_3 \cdot g_2 + g_3) \qquad (16)$$

In Equation (16), the first and second items on the right side are the group items, respectively. Among them, the first item on the right side is transformed to AND of common item ($p_3 \cdot p_2$) and non-common item ($p_1 \cdot g_0 + g_1$). When the number of group items in the OR operation formula after grouping is larger than 2, the grouping and the transformation are carried out repeatedly for the group items in the order corresponding to the number order of the first-fourth logic operation items in the OR operation formula after the grouping. Because the number of group items is 2 for the OR operation formula of Equation (16), in this case, no further grouping and transformation are performed.

As far as the structure of Equation (16) obtained here is concerned, one can see that the generation circuit of carry generation signal G can be composed of two types of gates. That is, one can form the generation circuit of carry generation signal G shown in Equation (16) by using a gate (first logic gate) that outputs a signal corresponding to AND of input 2-bit signals and a gate (second logic gate) that outputs a signal corresponding to OR of AND of 2-bit signals among input 3-bit signals and the other 1-bit signal. Also, the generation circuit of carry propagation signal P shown in Equation (15) can be composed of plural the first logic gates. Consequently, the 4-bit CLA circuit can be formed from the first logic gates and second logic gates.

FIG. 1 is a circuit diagram illustrating an example of the constitution of the 4-bit CLA circuit in Embodiment 1 of this invention. The 4-bit CLA circuit shown in FIG. 1 has NAND gates 101 and 102, NOR gate 103, AND-NOR type composite gates 201 and 202, and OR-NAND type composite gate 251. NAND gates 101 and 102 as well as NOR gate 103 form an embodiment of the first logic gate of this invention. AND-NOR composite gates 201 and 202 as well as OR-NAND type composite gate 251 form an embodiment of the second logic gate of this invention. NAND gate 101 has carry propagation signals $p_0$ and $p_1$ as its inputs, and outputs their NAND. NAND gate 102 takes carry propagation signals $p_2$ and $p_3$ as inputs, and outputs their NAND. The output signal corresponds to the signal of NOT of the result of operation for the common item ($p_3 \cdot p_2$) in Equation (16). NOR gate 103 outputs NOR of the output signals of NAND gates 101 and 102. This output signal corresponds to the result of operation for carry propagation signal P shown in Equation (15). Also, NOR of the two signals is equivalent to the result of AND after NOT of the signals, respectively. In the example shown in FIG. 1, in order to facilitate understanding, the symbols of NOR gates have been replaced with the symbols of the equivalent AND gates.

AND-NOR type composite gate 201 takes carry generation signals $g_0$ and $g_1$ as well as carry propagation signal $p_1$ as inputs, and it outputs NOR of the AND of carry propagation signal $p_1$ and carry generation signal $g_0$ and of carry generation signal $g_1$. This output signal corresponds to the signal of NOT of the result of operation for non-common item ($p_1 \cdot g_0 + g_1$) in Equation (16). AND-NOR type composite gate 202 takes carry generation signals $g_2$ and $g_3$ as well as carry propagation signal $p_3$ as inputs, and it outputs NOR of the AND of carry propagation signal $p_3$ and carry generation signal $g_2$ and of carry generation signal $g_3$. This output signal corresponds to the signal of NOT of the result of operation for the group item ($p_3 \cdot g_2 + g_3$) in Equation (16). OR-NAND type composite gate 251 outputs NAND of the OR of the output signals of NAND gate 102 and NAND-NOR type composite gate 201 and the output of AND-NOR type composite gate 202. This output signal corresponds to the result of operation for carry generation signal G shown in Equation (16). Also, AND of the OR of the two signals and the one signal is equal to OR of the result of the operation of AND of NOT of the two signals and the result of NOT of the one signal. In the example shown in FIG. 1, in order to facilitate understanding, the symbol of the OR-NAND type composite gate is replaced with the symbol of AND-OR equivalent to it.

In the following, an example of the detailed circuit constitution of the AND-NOR type composite gates and OR-NAND type composite gates will be explained with reference to the circuit diagrams shown in FIGS. 2 and 3. The AND-NOR type composite gate shown in FIG. 2(B) has n-type MOS transistors Qn10-Qn12, and p-type MOS transistors Qp (10)-Qp (12). N-type MOS transistors Qn10 and Qn11 are connected in series between output terminal Y and ground line G, and this series circuit is connected parallel to n-type MOS transistor Qn12. P-type MOS transistors Qp10 and Qp11 are connected in parallel, and this parallel circuit is connected in series with p-type MOS transistor Qp12 between output terminal Y and power source line Vcc. The gates of n-type MOS transistor Qn10 and p-type MOS transistor Qp10 are connected to input terminal A. The gates of n-type MOS transistor Qn11 and p-type MOS transistor Qp11 are connected to input terminal B. The gates of n-type MOS transistor Qn12 and p-type MOS transistor Qp12 are connected to input terminal C. When input terminal C is on the high level, n-type MOS transistor Qn12 is ON, and p-type MOS transistor Qp12 is OFF. Consequently, the output terminal Y is on the low level. Also, when input terminal A and input terminal B are on the high level, n-type MOS transistors Qn10 and Qn11 are ON, and p-type MOS transistors Qp10 and Qp11 are OFF. Consequently, output terminal Y becomes low level. When input terminal C is on the low level, and input terminal A and/or input terminal B are on the low level, too, n-type MOS transistor Qn12 is OFF, and n-type MOS transistor Qn10 and/or n-type MOS transistor Qn11 are OFF. Consequently, connection between output terminal Y and ground line G is cut off. Also, when p-type MOS transistor Qp12 is ON, and p-type MOS transistor Qp10 and/or Qp11 are OFF, output terminal Y is connected to power source line Vcc. As a result, output terminal Y becomes high level. With the operation, a signal corresponding to NOR of the AND of the input signals of input terminals A and B and the input signal of input terminal C is output to output terminal Y.

The AND-NOR type composite gate shown in FIG. 2(C) has the same constitution as that shown in FIG. 2(B). The two, however, are different from each other in the connection configuration of the parallel circuit of p-type MOS transistors Qp10 and Qp11 and p-type MOS transistor Qp12. That is, in the circuit shown in FIG. 2(C), the parallel circuit of p-type MOS transistors Qp10 and Qp11 is connected to output terminal Y, and p-type MOS transistor Qp12 is connected to power source line Vcc. On the other hand, in the circuit shown in FIG. 2(B), connection is made reverse to the configuration. However, although there is the difference, the two are identical to each other with respect to operation pertaining to ON/OFF of conduction between power source line Vcc and output terminal Y. Consequently, in the circuit shown in FIG. 2(C), also, the same function as that of the circuit shown in FIG. 2(B) can be realized.

The OR-NAND type composite gate shown in FIG. 3(B) has n-type MOS transistors Qn13-Qn15 and p-type MOS transistors Qp13-Qp15. N-type MOS transistors Qn13 and Qn14 are connected in parallel, and this parallel circuit and n-type MOS transistor Qn15 are connected in series between output terminal Y and ground line G. P-type MOS transistors Qp13 and Qp14 are connected in series between output terminal Y and power source line Vcc, and this series circuit and p-type MOS transistor Qp15 are connected in parallel. The gates of n-type MOS transistor Qn13 and p-type MOS transistor Qp13 are connected to input terminal A. The gates of n-type MOS transistor Qn14 and p-type MOS transistor Qp14 are connected to input terminal B. The gates of n-type MOS transistor Qn15 and p-type MOS transistor Qp15 are connected to input terminal C. In the case when input terminal C is on the low level, p-type MOS transistor Qp15 is ON, and n-type MOS transistor Qn15 is OFF. Consequently, output terminal Y becomes high level. Also, when both input terminal A and input terminal B are on the low level, p-type MOS transistors Qp13 and Qp14 are ON, and n-type MOS transistors Qn13 and Qn14 are OFF. Consequently, output terminal Y becomes high level.

When input terminal C is on the high level and input terminal A and/or input terminal B are on the high level, n-type MOS transistor Qn15 is ON, and n-type MOS transistor Qn13 and/or Qn14 are ON. Consequently, output terminal Y and ground line G are connected to each other. Also, because p-type MOS transistor Qp15 is OFF and p-type MOS transistor Qp13 and/or Qp14 are OFF, connection between output terminal Y and power source line Vcc is cut off. Consequently, output terminal Y becomes low level. By means of the operation, a signal corresponding to NAND of the OR of input terminals A and B and the input signal of input terminal C is output from output terminal Y.

Figure 3C:
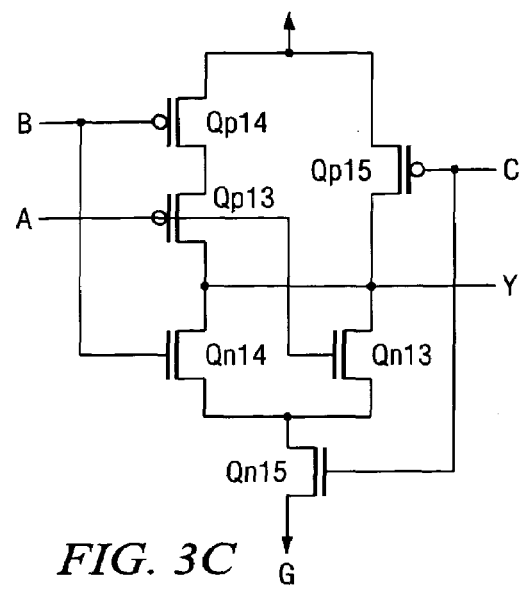

The OR-NAND type composite gate shown in FIG. 3(C) has the same constitution as that shown in FIG. 3(B). The two, however, are different from each other with respect to the connection configuration of the parallel circuit of n-type MOS transistors Qn13 and Qn14 and n-type MOS transistor Qn15. That is, in the circuit shown in FIG. 3(C), the parallel circuit of n-type MOS transistors Qn13 and Qn14 is connected to output terminal Y, and n-type MOS transistor Qn15 is connected to ground line G. On the other hand, in the circuit shown in FIG. 3(B), the connection is the reverse of the configuration. However, although there is the difference, the two are identical to each other with respect to operation pertaining to ON/OFF of conduction between ground line G and output terminal Y. Consequently, in the circuit shown in FIG. 3(C), too, the same function as that of the circuit shown in FIG. 3(B) can be realized.

As explained above, in the 4-bit CLA circuit shown in FIG. 1, using two types of logic gates (first logic gates and second logic gates), circuits for output of carry generation signal G shown in Equation (14) and carry propagation signal P shown in Equation (15) are formed, respectively.

As the first logic gates, NAND gates 101, 102 and NOR gate 103 are used, and, as the second logic gates, AND-NOR type composite gates 201, 202 and OR-NAND type composite gate 251 are used. For example, the second logic gate can be realized from the AND-NOR type composite gate shown in FIG. 2 or the OR-NAND type composite gate shown in FIG. 3. By using the composite gates, the number of series stages of transistors inserted between output terminal Y and power source line Vcc and the number of series stages of transistors inserted between output terminal Y and ground line G are at most 2 stages. This stage number is the same as that of a 2-input NAND gate or 2-input NOR gate used in a conventional logic circuit.

Figure 20:
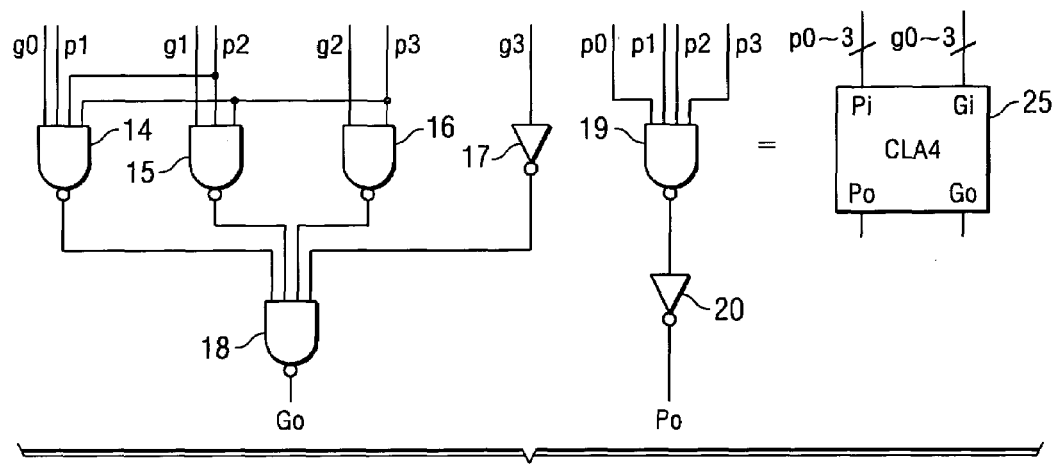
FIG. 20 is a circuit diagram illustrating an example of the constitution of a CLA circuit in the carry signal generation circuit shown in FIG. 18.
Figure 21:
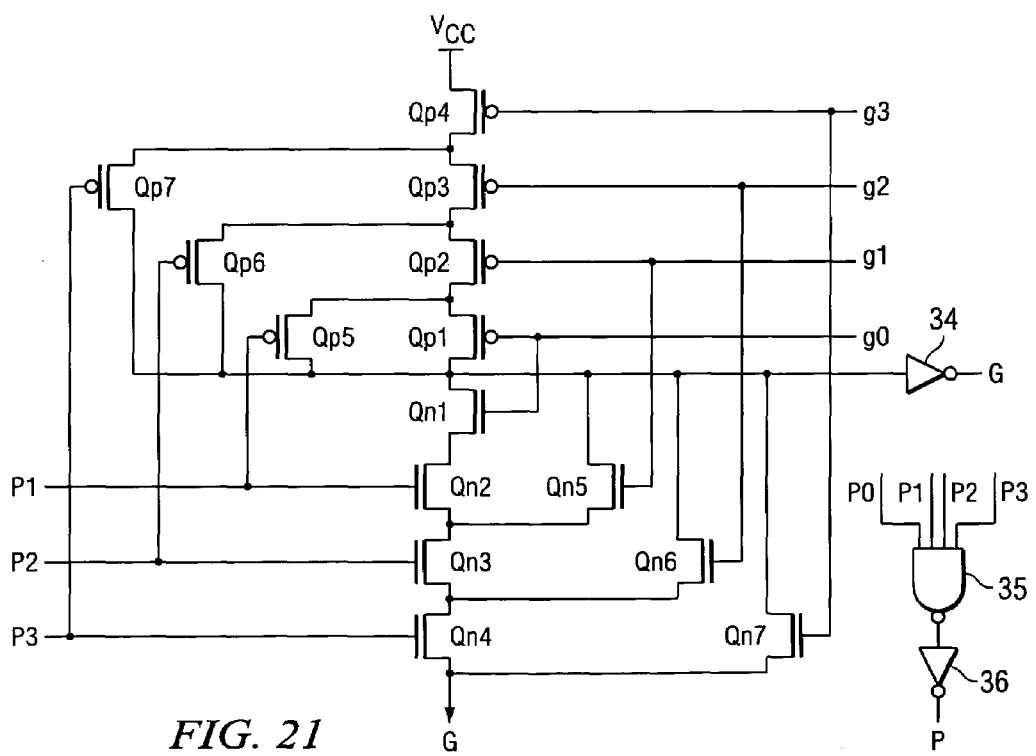
FIG. 21 is a circuit diagram illustrating an example of a CLA circuit formed using composite type gates.

Consequently, by means of the 4-bit CLA circuit shown in FIG. 1, one can realize a CLA circuit without using a multi-input logic gate having 3 or more series stages of transistors inserted between the output terminal and the power source line or ground line, such as the multi-input gate shown in FIG. 20 or the composite gate shown in FIG. 21. As a result, when comparison is made at the same operation speed, it is possible to reduce the size of transistors, to reduce the circuit size, and to lower the power consumption. In addition, because it is possible to reduce the gate capacitance by having a smaller transistor size, it is possible to lower the power consumption and to reduce the circuit size for the former-stage circuit that drives the CLA circuit. As a result, it is possible to further reduce the overall circuit size and power consumption of the circuit. Also, when comparison is made for the same transistor size, it is possible to further increase the operation speed.

In the following, the performance of the two CLA circuits shown in FIGS. 20 and 1 will be evaluated by means of electronic circuit simulation. The delay from the time of input of various signals ($p_0$-$p_3$, $g_0$-$g_3$) to the time of output of carry generation signal G is 0.234 ns for the CLA circuit shown in FIG. 20 and 0.229 ns for the CLA circuit shown in FIG. 1. That is, the two circuits have almost the same delay in carry generation signal G. The delay from the time of input of various signals ($p_0$-$p_3$) to the time of output of carry propagation signal P is 0.174 ns for the CLA circuit shown in FIG. 20 and 0.202 ns for the CLA circuit shown in FIG. 1. That is, as far as propagation of carry propagation signal P is concerned, the speed of the circuit shown in FIG. 1 is a little lower than that of the conventional circuit shown in FIG. 20. However, because the propagation path of carry propagation signal P usually is not a critical path, it is believed that there is no influence on the operation speed of the overall adder.

The sum of the widths of the transistors used in the circuits has been calculated. As a result, it is found that the sum of the widths is 74.5 µm for the CLA circuit shown in FIG. 20, and 39.3 µm for the CLA circuit shown in FIG. 1. That is, the sum of the widths of the transistors in the circuit shown in FIG. 1 is about half that of the conventional circuit shown in FIG. 20. The cause is as follows: in the conventional circuit shown in FIG. 20, plural multi-input logic gates, such as 4-input NAND gates, that require large transistors are used. On the other hand, in the circuit shown in FIG. 1, for any of the logic gates, only two or fewer stages of series transistors are inserted between the output terminal and the power source line or ground line. Consequently, compared with multi-input gates having three or more series stages, the transistor width becomes smaller. Usually, CMOS circuit size and power consumption are proportional to transistor width. Consequently, for the circuit shown in FIG. 1, it is expected that while the same signal delay as that with the conventional circuit shown in FIG. 20 can be realized, the circuit size and power consumption can be nearly halved.

The sum of the input capacitances to CLA circuits has been calculated, and it was found to be 47 fF for the CLA circuit shown in FIG. 20, and 20 fF for the CLA circuit shown in FIG. 1. That is, the sum of input capacitances of the circuit shown in FIG. 1 is only 42% of that of the conventional circuit shown in FIG. 20. Because of reduction in input capacitance, it is possible to reduce the driving power required for the former-stage circuit for driving the CLA circuit. As a result, it is possible to reduce the size and power consumption for the overall adder.

Embodiment 2

In the following, a 5-bit CLA circuit pertaining to Embodiment 2 of this invention will be explained. The 5-bit CLA circuit takes 5-bit carry propagation signal ($p_0, \ldots, p_4$) and 5-bit carry generation signal ($g_0, \ldots, g_4$) as inputs, and corresponding to these input signals, it outputs 1-bit carry propagation signal P and 1-bit carry generation signal G. Here, the least significant position (the first position), . . . , and the most significant position (the fifth position) of the 5-bit carry propagation signal correspond to carry propagation signals $p_0, \ldots, p_4$, respectively. Also, the least significant position (the first position), . . . , and the most significant position (the fifth position) of the 5-bit carry generation signal correspond to carry generation signals $g_0, \ldots, g_4$, respectively. Using carry propagation signal ($p_0, \ldots, p_4$) and carry generation signal ($g_0, \ldots, g_4$), one can represent carry propagation signal P and carry generation signal G as the following equations.

[Numerical Formula 14]

$$G = p_4 \cdot p_3 \cdot p_2 \cdot p_1 \cdot g_0 + p_4 \cdot p_3 \cdot p_2 \cdot g_1 + p_4 \cdot p_3 \cdot g_2 + p_4 \cdot g_3 + g_4 \quad (17)$$

$$P = p_4 \cdot p_3 \cdot p_2 \cdot p_1 \cdot p_0 \quad (18)$$

If AND of the fifth position to second position of the input carry propagation signal and the first position of the input carry generation signal is taken as the first logic operation item, this first logic operation item corresponds to the first item ($p_4 \cdot p_3 \cdot p_2 \cdot p_1 \cdot g_0$) on the right side of Equation (17). If AND of the fifth position to-third position of the input carry propagation signal and the second position of the input carry generation signal is taken as the second logic operation item, this second logic operation item corresponds to the second item ($p_4 \cdot p_3 \cdot p_2 \cdot g_1$) on the right side of Equation (17). If AND of the fifth and fourth positions of the input carry propagation signal and the third position of the input carry generation signal is taken as the third logic operation item, this third logic operation item corresponds to the third item ($p_4 \cdot p_3 \cdot p_2$) on the right side of Equation (17). If AND of the fifth position of the input carry propagation signal and the fourth position of the input carry generation signal is taken as the fourth logic operation item, this fourth logic operation item corresponds to the fourth item ($p_4 \cdot g_3$) on the right side of Equation (17). If the fifth position of the input carry generation signal is taken as the fifth logic operation item, this fifth logic operation item corresponds to the fifth item ($g_4$) on the right side of Equation (17).

Consequently, carry generation signal G output from the 5-bit CLA circuit is given as a result of the operation of OR of the five items (first logic operation item-fifth logic operation item). Here, for the Equation (17), just as in the case of Equation (16), the following transformation is performed. Equation (17) is a formula of operation of OR of the five items, that is, the first logic operation item through the fifth logic operation item, set side-by-side in numerical order. First of all, for the Equation (17), grouping is performed with OR for every adjacent two items taken as a group item in order from the first logic operation item or the fifth logic operation item, that is, from the left side or right side of the equation in a sequential way. Then, when a common item exists in the two grouped items, OR of the two items in the group item is transformed to AND of the common item and non-common item The following is the equation representing the operation of OR after the grouping and transformation from the left side of Equation (17).

[Numerical Formula 15]

$$G = (p_4 \cdot p_3 \cdot p_2) \cdot (p_1 \cdot g_0 + g_1) + p_4 (p_3 \cdot g_2 + g_3) + g_4 \quad (19)$$

In Equation (19), the first-third items on the right side are the group items, respectively. Among them, the first item on the right side is transformed to AND of common item ($p_4 \cdot p_3 \cdot p_2$) and non-common item ($p_1 \cdot g_0 + g_1$). The second term on the right side is transformed to AND of common item ($p_4$) and non-common item ($p_3 \cdot g_2 + g_3$). Also, the third item on the right side ($g_4$) is the other item in the grouping treatment of Equation (17), and it is also handled as one group item. When the number of group items in the OR operation formula after grouping is larger than 2, the grouping and the transformation are carried out repeatedly for the group items in the order corresponding to the number order of the first-fifth logic operation items in the OR operation formula after the grouping. Because the number of group items is 3 for the OR operation formula of Equation (19), further grouping and transformation are performed.

When grouping and transformation are performed from the left side of Equation (19), the operation formula of OR of Equation (19) becomes the following equation.

[Numerical Formula 16]

$$G=p_4\{(p_3 \cdot p_2) \cdot (p_1 \cdot g_0+g_1)+(p_3 \cdot g_2+g_3)\}+g_4 \quad (20)$$

Because the group item number is 2 for Equation (20), no further grouping and transformation are performed for Equation (20). As far as the structure of Equation (20) obtained here is concerned, one can see that the generation circuit of carry generation signal G can be composed of two types of gates. That is, one can form the generation circuit of carry generation signal G shown in Equation (20) by using the first logic gate and second logic gate.

When a NAND gate or NOR gate is used as the first logic gate, or when an AND-NOR type composite gate and OR-NAND type composite gate is used the second logic gate, in addition to the first logic gate and second logic gate, it is necessary to have a third logic gate, that is, an inverter, that outputs NOT of a 1-bit signal. Also, for the generation circuit of carry propagation signal P shown in Equation (18), one may use plural the first logic gates. Consequently, the 5-bit CLA circuit can be formed using two types of gates (first and second logic gates) or three types of gates (first logic gate-third logic gate).

Figure 4:
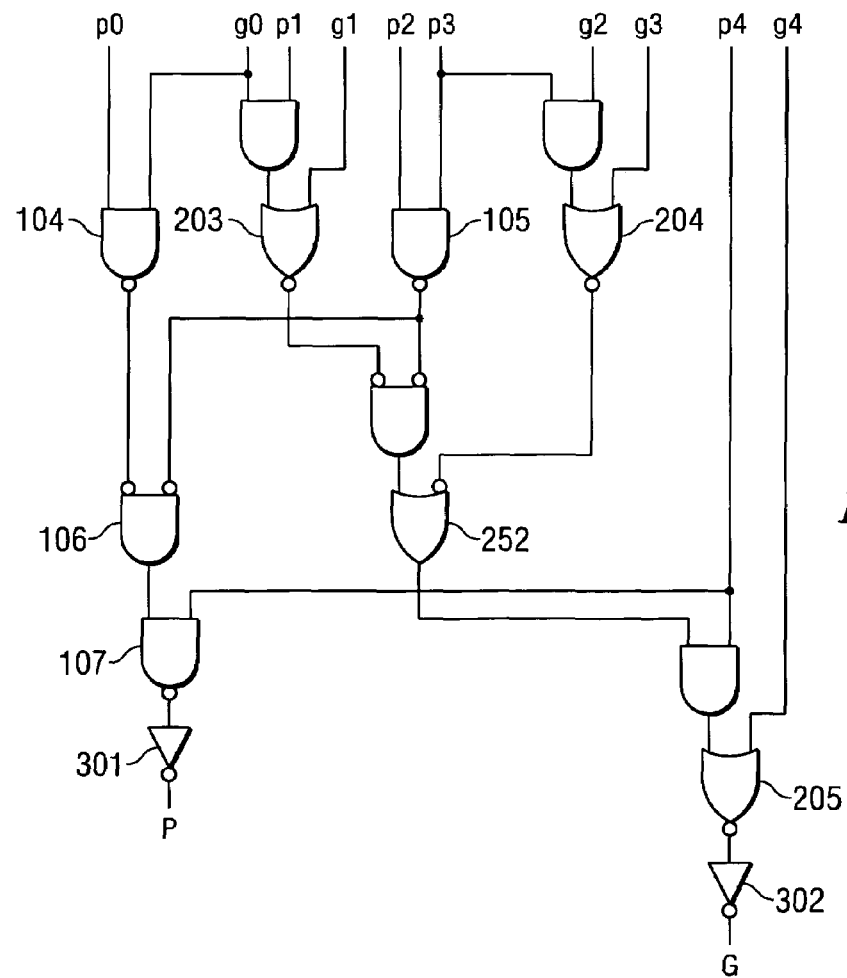
FIG. 4 is a circuit diagram illustrating an example of the constitution of the 5-bit CLA circuit pertaining to Embodiment 2 of this invention.

FIG. 4 is a circuit diagram illustrating an example of the constitution of the 5-bit CLA circuit in Embodiment 2 of this invention. The 5-bit CLA circuit shown in FIG. 4 has NAND gates 104, 105 and 107, NOR gate 106, AND-NOR type composite gates 203-205, OR-NAND type composite gate 252, and inverters 301 and 302. NAND gates 104, 105 and 107 as well as NOR gate 106 form an embodiment of the first logic gate of this invention. AND-NOR composite gates 203-205 as well as OR-NAND type composite gate 252 form an embodiment of the second logic gate of this invention. Inverters 301 and 302 form an embodiment of the third logic gate of this invention. NAND gate 104 has carry propagation signals $p_0$ and $p_1$ as its inputs, and outputs their NAND. NAND gate 105 takes carry propagation signals $p_2$ and $p_3$ as inputs, and outputs their NAND. The output signal corresponds to the signal of NOT of the result of operation for the logic product $(p_3 \cdot p_2)$ of the 2-bit carry propagation signal in Equation (20). NOR gate 106 outputs NOR of the output signals of NAND gates 104 and 105. NAND gate 107 outputs NAND of the output signal of NOR gate 106 and carry propagation signal $p_4$. Inverter 301 outputs NOT of the output signal of NAND gate 107. The output signal corresponds to the result of operation for carry propagation signal P shown in Equation (18). AND-NOR type composite gate 203 takes carry generation signals $g_0$ and $g_1$ as well as carry propagation signal $p_1$ as inputs, and it outputs NOR of the AND of carry propagation signal $p_1$ and carry generation signal $g_0$ and the carry generation signal $g_1$. This output signal corresponds to the signal of NOT of the result of operation for non-common item $(p_1 \cdot g_0+g_1)$ in Equation (20). AND-NOR type composite gate 204 takes carry generation signals $g_2$ and $g_3$ as well as carry propagation signal $p_3$ as inputs, and it outputs NOR of the AND of carry propagation signal $p_3$ and carry generation signal $g_2$ and the carry generation signal $g_3$. This output signal corresponds to the signal of NOT of the result of operation for the non-common item $(p_3 \cdot g_2+g_3)$ in Equation (20).

OR-NAND type composite gate 252 outputs NAND of the OR of the output signals of NAND gate 105 and NAND-NOR type composite gate 203 and the output of AND-NOR type composite gate 204. This output signal corresponds to the result of operation for the following non-common item in Equation (20):

$$|(p_3 \cdot p_2) \cdot (p_1 \cdot g_0+g_1)+(p_3 \cdot g_2+g_3)|$$

AND-NOR type composite gate 205 outputs NOR of the AND of the output signal of OR-NAND type composite gate 252 and carry propagation signal $p_4$, and the carry generation signal $g_4$. Inverter 302 outputs NOT of the output signal of AND-NOR type composite gate 205. This output signal corresponds to the result of operation for carry generation signal G shown in Equation (20). Also, one may use the circuits shown in FIG. 2 or FIG. 3 for the AND-NOR type composite gates and OR-NAND type composite gate (203-205, 252) used in the CLA circuit shown in FIG. 4. As explained above, in the 5-bit CLA circuit shown in FIG. 4, three types of logic gates (first logic gate to third logic gate) are used to form the circuit for output of carry generation signal G shown in Equation (17) and carry propagation signal P shown in Equation (18). That is, as the first logic gate, NAND gates 104, 105, 107, and NOR gate 106 are used. As the second logic gate, AND-NOR type composite gates 203-205 and OR-NAND type composite gate 252 are used. As the third logic gate, inverters 301 and 302 are used.

For example, the second logic gate is formed using an AND-NOR type composite gate shown in FIG. 2 and an OR-NAND type composite gate shown in FIG. 3. Consequently, just as for the CLA circuit shown in FIG. 1, for the 5-bit CLA circuit shown in FIG. 4, it is possible to realize the CLA circuit without using a multi-input gate having 3 or more series stages of transistors inserted between the output terminal and the power source line or ground line. Consequently, the same effects as those of the CLA circuit shown in FIG. 1 can be realized. That is, when a comparison is made at the same operation speed, it is possible to have a smaller circuit size and a lower power consumption. On the other hand, when a comparison is made with the same circuit size, it is possible to increase the operation speed.

Embodiment 3

In the following, a 5-bit CLA circuit pertaining to Embodiment 3 of this invention will be explained. The Equation (20) is a logic formula obtained by grouping the following three group items in Equation (19)

$$(p_4 \cdot p_3 \cdot p_2) \cdot (p_1 \cdot g_o + g_1),$$

$$p_4 \cdot (p_3 \cdot g_2 + g_3),$$

$$g_4,$$

from the side of the first logic operation item, that is, from the left side of Equation (19). Then, in a reverse way, grouping and transformation are performed from the right side of Equation (19), and the following equation is obtained.

[Numerical Formula 17]

$$G=(p_4 \cdot p_3 \cdot p_2) \cdot (p_1 \cdot g_0+g_1)+\{p_4(p_3 \cdot g_2+g_3)+g_4\} \quad (21)$$

By studying the constitution of Equation (21) obtained in the above, one can see that a 5-bit CLA circuit with a constitution different from that of the circuit shown in FIG. 4 can be formed using the two types of gates (first and second logic gates) or three types of gates (first logic gate-third logic gate).

Figure 5:
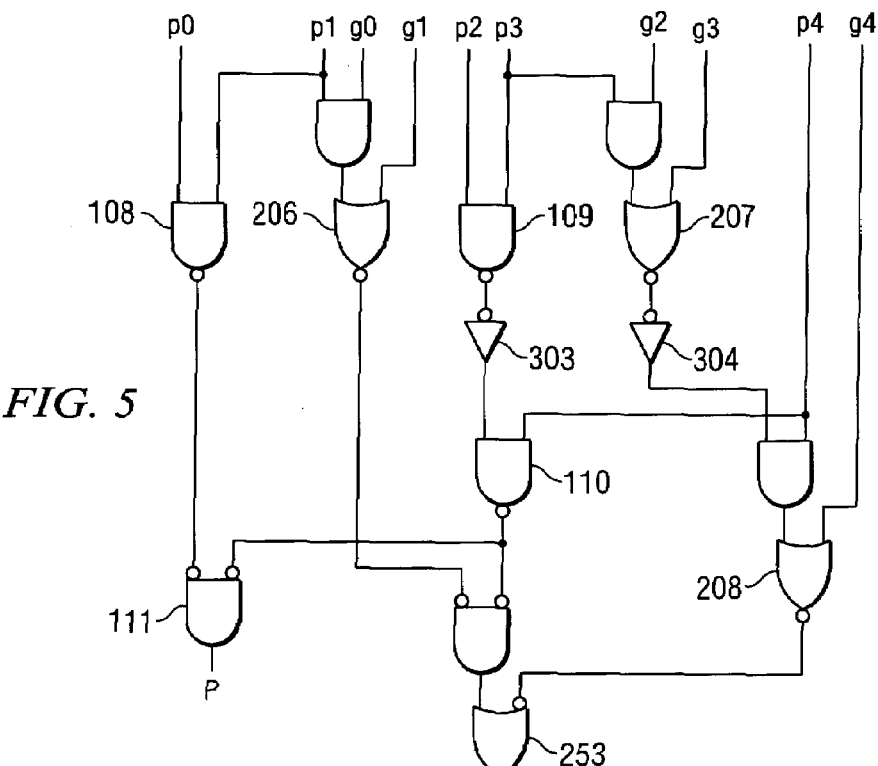
FIG. 5 is a circuit diagram illustrating an example of the constitution of the 5-bit CLA circuit pertaining to Embodiment 3 of this invention.

FIG. 5 is a circuit diagram illustrating an example of the constitution of the 5-bit CLA circuit in Embodiment 3 of this invention. The 5-bit CLA circuit shown in FIG. 5 has NAND gates 108-110, NOR gate 111, AND-NOR type composite gates 206-208, OR-NAND type composite gate 253, and inverters 303 and 304. NAND gates 108-110 as well as NOR gate 111 form an embodiment of the first logic gate of this invention. AND-NOR composite gates 206-208 as well as OR-NAND type composite gate 253 form an embodiment of the second logic gate of this invention. Inverters 303 and 304 form an embodiment of the third logic gate of this invention. NAND gate 108 has carry propagation signals $p_0$ and $p_1$ as its inputs, and outputs their NAND. NAND gate 109 takes carry propagation signals $p_2$ and $p_3$ as inputs, and outputs their NAND. Inverter 303 outputs NOT of the output signal of NAND gate 109. NAND gate 110 outputs NAND of the output signal of inverter 303 and carry propagation signal $p_4$. The output signal corresponds to the result of operation for NOT of AND of the 3-bit carry propagation signal shown in Equation (21) ($p_4 \cdot p_3 \cdot p_2$). NOR gate 111 outputs NOR of the output signals of NAND gate 108 and NAND gate 110. This output signal corresponds to the result of operation for carry propagation signal P shown in Equation (18). AND-NOR type composite gate 206 takes carry generation signals $g_0$ and $g_1$ as well as carry propagation signal $p_1$ as inputs, and it outputs NOR of the AND of carry propagation signal $p_1$ and carry generation signal $g_0$ and the carry generation signal $g_1$. This output signal corresponds to the signal of NOT of the result of operation for non-common item ($p_1 \cdot g_0 + g_1$) in Equation (21). AND-NOR type composite gate 207 takes carry generation signals $g_2$ and $g_3$ as well as carry propagation signal $p_3$ as inputs, and it outputs NOR of the AND of carry propagation signal $p_3$ and carry generation signal $g_2$ and the carry generation signal $g_3$. Inverter 304 outputs NOT of the output signal of AND-NOR type composite gate 207. This output signal corresponds to the result of operation for the non-common item ($p_3 \cdot g_2 + g_3$) in Equation (21). AND-NOR type composite gate 208 outputs NOR of the AND of the output signal of inverter 304 and carry propagation signal $p_4$ and the carry generation signal $g_4$. This output signal corresponds to the signal of NOT of the result of operation for the following group item in Equation (21):

|$p_4 \cdot (p_3 \cdot g_2 + g_3) + g_4$|

OR-NAND type composite gate 253 outputs NOR of AND of the output signals of AND-NOR type composite gate 206 and NAND gate 110 and the output signal of AND-NOR type composite gate 208. This output signal corresponds to the result of operation for carry generation signal G shown in Equation (21). Also, one may use the circuits shown in FIG. 2 or FIG. 3 for the AND-NOR type composite gates and OR-NAND type composite gate (206-208, 253) used in the CLA circuit shown in FIG. 5.

As explained above, in the 5-bit CLA circuit shown in FIG. 5, three types of logic gates (first logic gate to third logic gate) are used to form the circuit for output of carry generation signal G and carry propagation signal P. That is, as the first logic gate, NAND gates 108-110, and NOR gate 111 are used. As the second logic gate, AND-NOR type composite gates 206-208 and OR-NAND type composite gate 253 are used. As the third logic gate, inverters 303 and 304 are used. For example, the second logic gate is formed using an AND-NOR type composite gate shown in FIG. 2 and an OR-NAND type composite gate shown in FIG. 3. Consequently, just as for the CLA circuits shown in FIGS. 1 and 4, for the 5-bit CLA circuit shown in FIG. 5, it is possible to realize the CLA circuit without using a multi-input gate having 3 or more series stages of transistors inserted between the output terminal and the power source line or ground line. Consequently, the same effects as those of the CLA circuits shown in FIGS. 1 and 4 can be realized. That is, it is possible to reduce the circuit size and the power consumption.

Embodiment 4

In the following, a 5-bit CLA circuit pertaining to Embodiment 4 of this invention will be explained. The Equation (19) is a logic formula obtained by grouping the following five group items in Equation (17) (first logic operation item-fifth logic operation item)

$p_4 \cdot p_3 \cdot p_2 \cdot p_1 \cdot g_0$, $p_4 \cdot p_3 \cdot p_2 \cdot g_1$, $p_4 \cdot p_3 \cdot g_2$, $p_4 \cdot g_3$, $g_4$, from the side of the first logic operation item, that is, from the left side of Equation (17). Then, in a reverse way, grouping and transformation are performed from the right side of Equation (17), and the following equation is obtained.

[Numerical Formula 18]

$$G = p_4 \cdot p_3 \cdot p_2 \cdot p_1 \cdot g_0 + (p_4 \cdot p_3) \cdot (p_2 \cdot g_1 + g_2) + (p_4 \cdot g_3 + g_4) \quad (22)$$

Because the number of group items is 3 in Equation (22), further grouping and transformation are performed. When grouping and transformation are performed from the right side of Equation (22), the logic formula of Equation (22) becomes the following equation.

[Numerical Formula 19]

$$G = p_4 \cdot p_3 \cdot p_2 \cdot p_1 \cdot g_0 + \{(p_4 \cdot p_3) \cdot (p_2 \cdot g_1 \cdot g_3) + (p_4 \cdot g_3 \cdot g_4)\} \quad (23)$$

By studying the constitution of Equation (23) obtained above, one can see that it is possible to form a 5-bit CLA circuit having a constitution different from that of the circuits shown in FIGS. 4 and 5 by using the two types of gates (first and second logic gates) or three types of gates (first logic gate-third logic gate).

Figure 6:
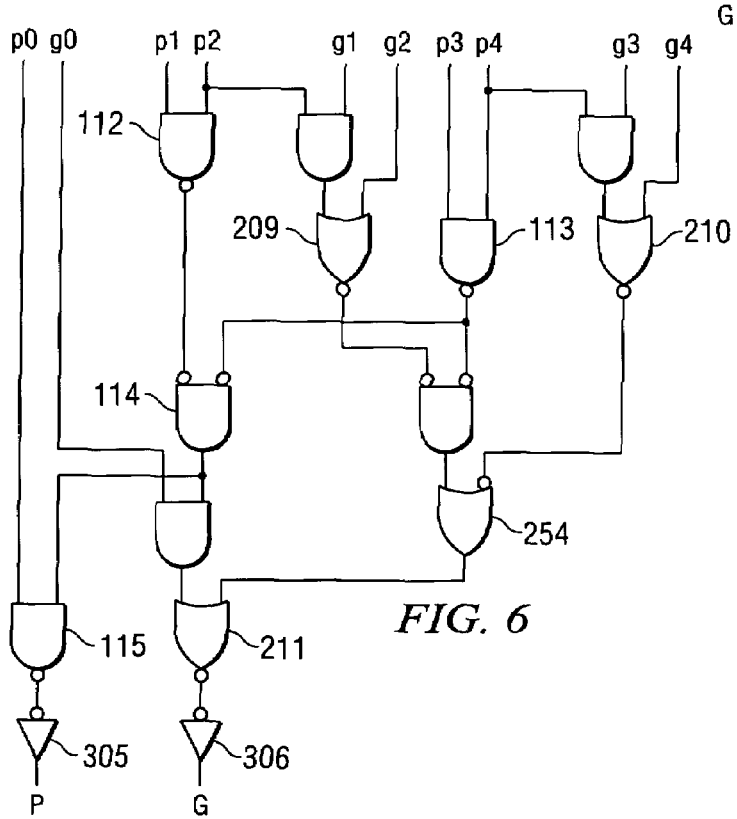
FIG. 6 is a circuit diagram illustrating an example of the constitution of the 5-bit CLA circuit pertaining to Embodiment 4 of this invention.

FIG. 6 is a circuit diagram illustrating an example of the constitution of the 5-bit CLA circuit in Embodiment 4 of this invention. The 5-bit CLA circuit shown in FIG. 6 has NAND gates 112, 113 and 115, NOR gate 114, AND-NOR type composite gates 209-211, OR-NAND type composite gate 254, and inverters 305 and 306. NAND gates 112, 113 and 115 as well as NOR gate 114 form an embodiment of the first logic gate of this invention. AND-NOR composite gates 209-211 as well as OR-NAND type composite gate 254 form an embodiment of the second logic gate of this invention. Inverters 305 and 306 form an embodiment of the third logic gate of this invention. NAND gate 112 has carry propagation signals $p_1$ and $p_2$ as its inputs, and outputs their NAND. NAND gate 113 takes carry propagation signals $p_3$ and $p_4$ as inputs, and outputs their NAND. NOR gate 114 outputs NOR of the output signals of NAND gates 112 and 113. This output signal corresponds to AND of AND ($p_4 \cdot p_3 \cdot p_2 \cdot p_1$) of the carry propagation 4-bit signals in Equation (23). NAND gate 115 outputs NAND of the output signal of NOR gate 114 and carry propagation signal $p_0$. Inverter 305 outputs NOT of the output signal of NAND gate 115. This output signal corresponds to the result of operation for carry propagation signal P shown in Equation (18). AND-NOR type composite gate 209 takes carry generation signals $g_1$ and $g_2$ as well as carry propagation signal $p_2$ as inputs, and it outputs NOR of the AND of carry propagation signal $p_2$ and carry generation signal $g_1$ and the carry generation signal $g_2$. This output signal corresponds to the signal of NOT of the result of operation for non-common item ($p_2 \cdot g_1 + g_2$) in Equation (23). AND-NOR type composite gate 210 takes carry generation signals $g_3$ and $g_4$ as well as carry propagation signal $p_4$ as inputs, and it outputs NOR of the AND of carry propagation signal $p_4$ and carry generation signal $g_3$ and the carry generation signal $g_4$. This output signal corresponds to the signal of NOT of the result of operation for the group item ($p_4 \cdot g_3 + g_4$) in Equation (23). OR-NAND type composite gate 254 outputs NAND of the OR of the output signals of NAND gate 113 and AND-NOR type composite gate 209 and the output signal of AND-NOR type composite gate 210. This output signal corresponds to the result of operation for the following group item in Equation (23):

$$\{(p_4 \cdot p_3) \cdot (p_2 \cdot g_1 + g_2) + (p_4 \cdot g_3 + g_4)\}$$

AND-NOR type composite gate 211 outputs NOR of AND of the output of NAND gate 114 and carry generation signal $g_0$ and the output signal of OR-NAND type composite gate 254. Inverter 306 outputs NOT of the output signal of AND-NOR type composite gate 211. This output signal corresponds to the result of operation for carry generation signal G shown in Equation (23).

Also, for example, one may use the circuits shown in FIG. 2 or FIG. 3 for the AND-NOR type composite gates and OR-NAND type composite gate 209-211, 254 used in the CLA circuit shown in FIG. 6. As explained above, in the 5-bit CLA circuit shown in FIG. 6, too, three types of logic gates (first logic gate to third logic gate) are used to form the circuit for output of carry generation signal G and carry propagation signal P. That is, as the first logic gate, NAND gates 112, 113, 115, and NOR gate 114 are used. As the second logic gate, AND-NOR type composite gates 209-211 and OR-NAND type composite gate 254 are used. As the third logic gate, inverters 305 and 306 are used. For example, the second logic gate is formed using an AND-NOR type composite gate shown in FIG. 2 and a OR-NAND type composite gate shown in FIG. 3. Consequently, just as for the CLA circuits shown in FIGS. 1, 4 and 5, for the 5-bit CLA circuit shown in FIG. 6, it is possible to realize the CLA circuit without using a multi-input gate having 3 or more series stages of transistors inserted between the output terminal and the power source line or ground line. Consequently, just as for the CLA circuits shown in FIGS. 1, 4 and 5, it is also possible to reduce the circuit size and the power consumption in this case.

Embodiment 5

In the following, a 5-bit CLA circuit pertaining to Embodiment 5 of this invention will be explained. The Equation (23) is a logic formula obtained by grouping the following three group items in Equation (22)

$$p_4 \cdot p_3 \cdot p_2 \cdot p_1 \cdot g_0,$$

$$p_4 \cdot p_3 \cdot (p_2 \cdot g_1 + g_2),$$

$$(p_4 \cdot g_3 + g_4)$$

from the side of the first logic operation item, that is, from the right side of Equation (22). Then, in a reverse way, grouping is performed from the side of the 5th logic calculation item, that is, the left side of Equation (22), and the following equation is obtained.

[Numerical Formula 20]

$$G = (p_4 \cdot p_3)\{p_2 \cdot p_1 \cdot g_0 + (p_2 \cdot g_1 + g_2)\} + (p_4 \cdot g_3 \cdot g_4) \quad (24)$$

By studying the constitution of Equation (24) obtained above, one can see that it is possible to form a 5-bit CLA circuit having a constitution different from that of the circuits shown in FIGS. 4-6 by using the two types of gates (first and second logic gates) or three types of gates (first logic gate-third logic gate).

Figure 7:
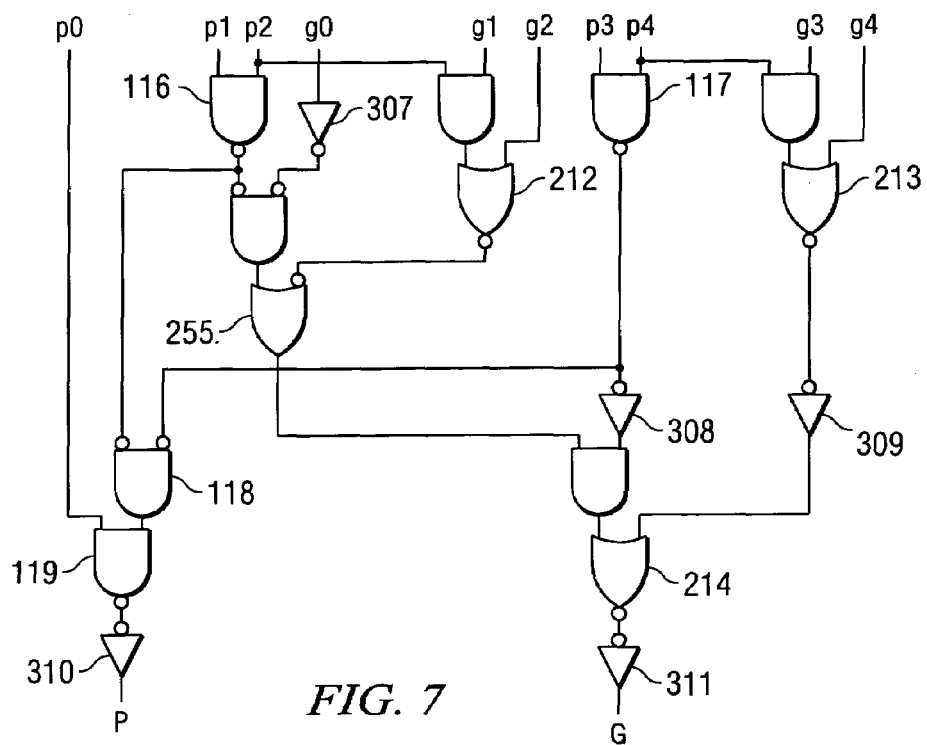
FIG. 7 is a circuit diagram illustrating an example of the constitution of the 5-bit CLA circuit pertaining to Embodiment 5 of this invention.

FIG. 7 is a circuit diagram illustrating an example of the constitution of the 5-bit CLA circuit in Embodiment 5 of this invention. The 5-bit CLA circuit shown in FIG. 7 has NAND gates 116, 117 and 119, NOR gate 118, AND-NOR type composite gates 212-214, OR-NAND type composite gate 255, and inverters 307-311. NAND gates 116, 117 and 119 as well as NOR gate 118 form an embodiment of the first logic gate of this invention. AND-NOR composite gates 212-214 as well as OR-NAND type composite gate 255 form an embodiment of the second logic gate of this invention. Inverters 307 and 311 form an embodiment of the third logic gate of this invention. NAND gate 116 has carry propagation signals $p_1$ and $p_2$ as its inputs, and outputs their NAND. This output signal corresponds to the signal of NOT of the result of operation for AND ($p_2 \cdot p_1$) of the 2-bit carry propagation signal in Equation (24). NAND gate 117 takes carry propagation signals $p_3$ and $p_4$ as inputs, and outputs their NAND. Inverter 308 outputs NOT of the output signal of NAND gate 117. This output signal corresponds to the result of operation for the common item ($p_4 \cdot p_3$) in Equation (24). NOR gate 118 outputs NOR of the output signals of NAND gates 116 and 117. NAND gate 119 outputs NAND of the output signal of NOR gate 118 and carry propagation signal $p_0$. Inverter 310 outputs NOT of the output signal of NAND gate 119. This output signal corresponds to the result of operation for carry propagation signal P shown in Equation (18). AND-NOR type composite gate 212 takes carry generation signals $g_1$ and $g_2$ as well as carry propagation signal $p_2$ as inputs, and it outputs NOR of the AND of carry propagation signal $p_2$ and carry generation signal $g_1$ and the carry generation signal $g_2$. This output signal corresponds to the signal of NOT of the result of operation for non-common item ($p_2 \cdot g_1 + g_2$) in Equation (24). AND-NOR type composite gate 213 takes carry generation signals $g_3$ and $g_4$ as well as carry propagation signal $p_4$ as inputs, and it outputs NOR of the AND of carry propagation signal $p_4$ and carry generation signal $g_3$ and the carry generation signal $g_4$. Inverter 309 outputs NOT of the output signal of AND-NOR type composite gate 213. This output signal corresponds to the result of operation for the group item ($p_4 \cdot g_3 + g_4$) in Equation (24). Inverter 307 outputs NOT of carry generation signal $g_0$. OR-NAND type composite gate 255 outputs NAND of the OR of the output signals of NAND gate 116 and inverter 307 and the output signal of AND-NOR type composite gate 212. This output signal corresponds to the result of operation for the following non-common item in Equation (24):

$$\{p_2 \cdot p_1 \cdot g_0 + \cdot (p_2 \cdot g_1 + g_2)\}$$

AND-NOR type composite gate 214 outputs NOR of AND of the output signals of inverter 308 and OR-NAND type composite gate 255 and the output signal of inverter 309. Inverter 311 outputs NOT of the output signal of AND-NOR type composite gate 214. This output signal corresponds to the result of operation for carry generation signal G shown in Equation (24). Also, for example, one may use the circuits shown in FIG. 2 or FIG. 3 for the AND-NOR type composite gates and OR-NAND type composite gate (212-214, 255) used in the CLA circuit shown in FIG. 7.

As explained above, in the 5-bit CLA circuit shown in FIG. 7, too, three types of logic gates (first logic gate to third logic gate) are used to form the circuit for output of carry generation signal G and carry propagation signal P. That is, as the first logic gate, NAND gates 116, 117, 119, and NOR gate 118 are used. As the second logic gate, AND-NOR composite gates 212-214 and OR-NAND type composite gate 255 are used. As the third logic gate, inverters 307-311 are used. For example, the second logic gate is formed using an AND-NOR type composite gate shown in FIG. 2 and an OR-NAND type composite gate shown in FIG. 3. Consequently, just for as the CLA circuits shown in FIGS. 1, 4-6, for the 5-bit CLA circuit shown in FIG. 7, too, it is possible to realize the CLA circuit without using a multi-input gate having 3 or more series stages of transistors inserted between the output terminal and the power source line or ground line. Consequently, just as for the CLA circuits shown in FIGS. 1, 4-6, it is also possible to reduce the circuit size and the power consumption in this case.

Embodiment 6

In the following, a 6-bit CLA circuit pertaining to Embodiment 6 of this invention will be explained. The 6-bit CLA circuit has a 6-bit carry propagation signal ($p_0, \ldots, p_5$) and 6-bit carry generation signal ($g_0, \ldots, g_5$) as inputs, and, corresponding to the input signals, it outputs 1-bit carry propagation signal P and 1-bit carry generation signal G. The least significant position (the first position), …, and the most significant position (the sixth position) of the 6-bit carry propagation signal correspond to carry propagation signals $p_0, \ldots, p_5$, respectively. Also, the least significant position (the first position), …, and the most significant position (the sixth position) of the 6-bit carry generation signal correspond to carry generation signals $g_0, \ldots, g_5$, respectively. Using carry propagation signal ($p_0, \ldots, p_5$) and carry generation signal ($g_0, \ldots, g_5$), carry propagation signal P and carry generation signal G can be expressed by the following equations.

[Numerical Formula 21]

$$G = p_5 \cdot p_4 \cdot p_3 \cdot p_2 \cdot p_1 \cdot g_0 + p_5 \cdot p_4 \cdot p_3 \cdot p_2 \cdot p_1 \cdot g_1 + p_5 \cdot p_4 \cdot p_3 \cdot g_2 + p_5 \cdot p_4 \cdot g_3 + p_5 \cdot g_4 + g_5 \quad (25)$$

$$P = p_5 \cdot p_4 \cdot p_3 \cdot p_2 \cdot p_1 \cdot g_0 \quad (26)$$

If AND of the sixth position to second position of the input carry propagation signal and the first position of the input carry generation signal is taken as the first logic operation item, this first logic operation item corresponds to the first item ($p_5 \cdot p_4 \cdot p_3 \cdot p_2 \cdot p_1 \cdot g_0$) on the right side of Equation (25) If AND of the sixth position to third position of the input carry propagation signal and the second position of the input carry generation signal is taken as the second logic operation item, this second logic operation item corresponds to the second item ($p_5 \cdot p_4 \cdot p_3 \cdot p_2 \cdot g_1$) on the right side of Equation (25) If AND of the sixth position to fourth position of the input carry propagation signal and the third position of the input carry generation signal is taken as the third logic operation item, this third logic operation item corresponds to the third item ($p_5 \cdot p_4 \cdot p_3 \cdot g_2$) on the right side of Equation (25) If AND of the sixth position to fifth position of the input carry propagation signal and the fourth position of the input carry generation signal is taken as the fourth logic operation item, this fourth logic operation item corresponds to the fourth item ($p_5 \cdot p_4 \cdot g_3$) on the right side of Equation (17) If AND of the sixth position of the input carry propagation signal and the fifth position of the input carry generation signal is taken as the fifth logic operation item, this fifth logic operation item corresponds to the fifth item ($p_5 \cdot g_4$) on the right side of Equation (25) If the sixth position of the input carry generation signal is taken as the sixth logic operation item, this sixth logic operation item corresponds to the sixth item ($g_5$) on the right side of Equation (25). Consequently, carry generation signal G output from the 6-bit CLA circuit is given as a result of the operation of OR of the six items (first logic operation item-sixth logic operation item). Here, for the Equation (25), the following transformation is performed in the same way as for Equations (16), (19) and (22).

Equation (25) is a formula of operation of OR of six items, that is, the first logic operation item through the sixth logic operation item set side-by-side in numerical order. First of all, for the Equation (25), grouping is performed with OR of every adjacent two items taken as a group item in order from the first logic operation item or the sixth logic operation item, that is, from the left side or right side of the equation in a sequential way. Then, when a common item exists in the two group items, OR of the two items in the group item is transformed to AND of the common item and non-common item. The following is the equation representing the operation of OR of Equation (25) after the grouping and transformation from the left side or right side of Equation (25).

[Numerical Formula 22]

$$G = (p_5 \cdot p_4 \cdot p_3 \cdot p_2)(p_1 \cdot g_0 + g_1) + (p_5 \cdot p_4) \cdot (p_3 \cdot g_2 + g_3) + (p_5 \cdot g_4 + g_5) \quad (27)$$

In Equation (27), the first-third items on the right side are the group items, respectively. Among them, the first item on the right side is transformed to AND of common item ($p_5 \cdot p_4 \cdot p_3 \cdot p_2$) and non-common item ($p_1 \cdot g_0 + g_1$), and the second item on the right side is transformed to AND of common item ($p_5 \cdot p_4$) and non-common item ($p_3 \cdot g_2 + g_3$). Because the number of group items is 3 for the group items in Equation (27), in this case, further grouping and transformation are performed. As grouping and transformation are further performed from the left side of Equation (27), Equation (27) becomes the following equation.

[Numerical Formula 23]

$$G = (p_5 \cdot p_4)\{(p_3 \cdot p_2)(p_1 \cdot g_0 + g_1) + (p_3 \cdot g_2 + g_3)\} + (p_5 \cdot g_4 + g_5) \quad (28)$$

Because the number of group items in equation (28) is 2 for the grouped items in Equation (28), in this case, no further grouping and transformation are performed.

As far as the structure of Equation (28) obtained here is concerned, one can see that the generation circuit of carry generation signal G can be composed of the two types of gates (first logic gate and second logic gate), or three types of gates (first logic gate-third logic gate). Also, the generation circuit of carry propagation signal P shown in Equation (26) can be composed of plural the first logic gates. Consequently, the 6-bit CLA circuit can be formed from the two types of gates (first logic gate and second logic gate), or three types of gates (first logic gate-third logic gate).

Figure 8:
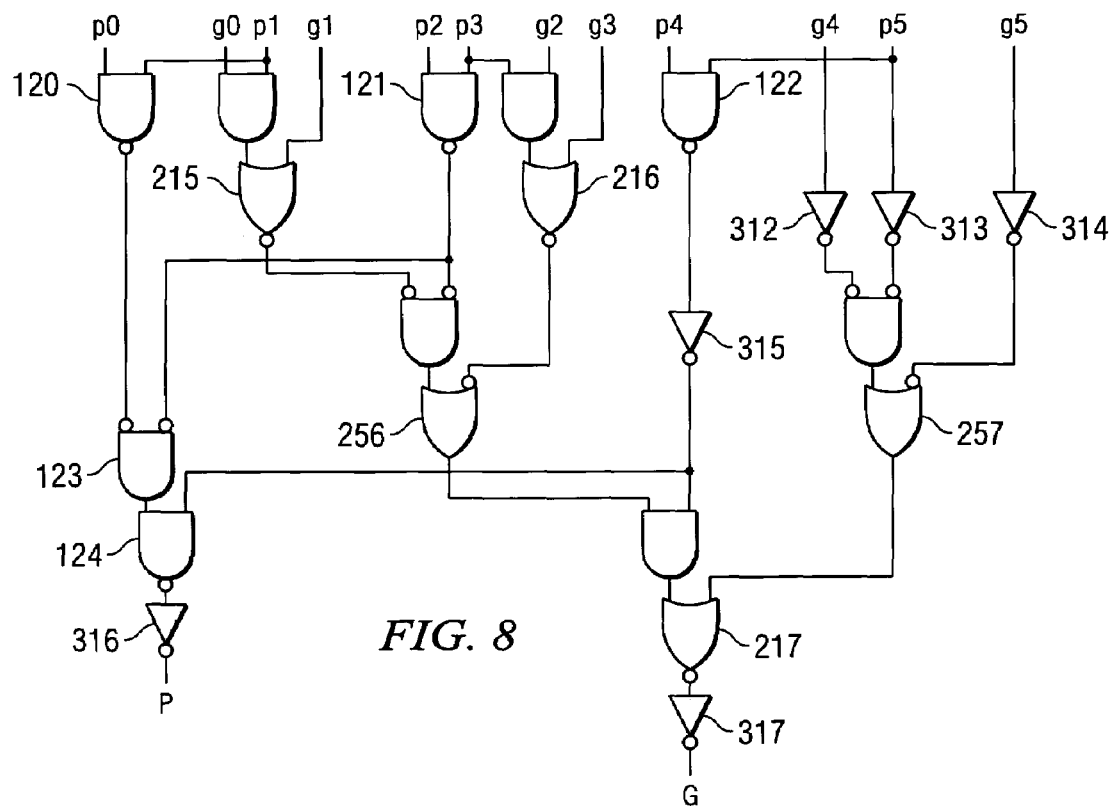
FIG. 8 is a circuit diagram illustrating an example of the constitution of the 6-bit CLA circuit pertaining to Embodiment 6 of this invention.

FIG. 8 is a circuit diagram illustrating an example of the constitution of the 6-bit CLA circuit in Embodiment 6 of this invention. The 6-bit CLA circuit shown in FIG. 8 has NAND gates 120-122 and 124, NOR gate 123, AND-NOR type composite gates 215-217, OR-NAND type composite gates 256 and 257, and inverters 312-317. NAND gates 120-122 and 124 as well as NOR gate 123 form an embodiment of the first logic gate of this invention. AND-NOR composite gates 215-217 as well as OR-NAND type composite gates 256 and 257 form an embodiment of the second logic gate of this invention. Inverters 312-317 form an embodiment of the third logic gate of this invention. NAND gate 120 has carry propagation signals $p_0$ and $p_1$ as its inputs, and outputs their NAND. NAND gate 121 takes carry propagation signals $p_2$ and $p_3$ as inputs, and outputs their NAND. The output signal corresponds to the signal of NOT of the result of operation for the 2-bit carry propagation signal $(p_3 \cdot p_2)$ in Equation (28). NAND gate 122 outputs NAND of carry propagation signals $p_4$ and $p_5$. Inverter 315 outputs NOT of the output signal of NAND gate 122. This output signal corresponds to the result of operation for the common item $(p_5 \cdot p_4)$ in Equation (28). NOR gate 123 outputs NOR of NAND gates 120 and 121. NAND gate 124 outputs NAND of the output signals of NOR gate 123 and inverter 315. Inverter 316 outputs NOT of the output signal of NAND gate 124. This output signal corresponds to the result of operation for carry propagation signal P shown in Equation (26). AND-NOR type composite gate 215 takes carry generation signals $g_0$ and $g_1$ as well as carry propagation signal $p_1$ as inputs, and it outputs NOR of the AND of carry propagation signal $p_1$ and carry generation signal $g_0$ and the carry generation signal $g_1$. This output signal corresponds to the signal of NOT of the result of operation for non-common item $(p_1 \cdot g_0 + g_1)$ in Equation (28). AND-NOR type composite gate 216 takes carry generation signals $g_2$ and $g_3$ as well as carry propagation signal $p_3$ as inputs, and it outputs NOR of the AND of carry propagation signal $p_3$ and carry generation signal $g_2$ and the carry generation signal $g_3$. This output signal corresponds to the signal of NOT of the result of operation for the non-common item $(p_3 \cdot g_2 + g_3)$ in Equation (28). Inverters 312, 313, 314 have carry generation signal $g_4$, carry propagation signal $p_5$, and carry generation signal $g_5$ as inputs, respectively, and output their NOT. OR-NAND type composite gate 257 outputs NAND of the OR of the output signals of inverters 312 and 313 and the output signal of inverter 314. This output signal corresponds to the result of operation for group item $(p_5 \cdot g_4 + g_5)$ in Equation (28). OR-NAND type composite gate 256 outputs NAND of the OR of the output signals of AND-NOR type composite gate 215 and NAND gate 121 and the output of AND-NOR type composite gate 216. This output signal corresponds to the result of operation for the following non-common item in Equation (28):

$$\{(p_3 \cdot p_2) \cdot (p_1 \cdot g_0 + g_1) + (p_3 \cdot g_2 + g_3)\}$$

AND-NOR type composite gate 217 outputs NOR of the AND of the output signals of OR-NAND type composite gate 256 and inverter 315 and the output signal of OR-NAND type composite gate 257. Inverter 317 outputs NOT of the output signal of AND-NOR type composite gate 217. This output signal corresponds to the result of operation for carry generation signal G shown in Equation (28). Also, the circuits shown in FIG. 2 or 3 may be used in AND-NOR type composite gates and OR-NAND type composite gates (215-217, 256, 257) used in the CLA circuit shown in FIG. 8.

As explained above, in the 6-bit CLA circuit shown in FIG. 8, using three types of logic gates (first logic gate-third logic gate), circuits for output of carry generation signal G shown in Equation (25) and carry propagation signal P shown in Equation (26) are formed. As the first logic gate, NAND gates 120-122, 124 and NOR gate 123 are used; as the second logic gate, AND-NOR type composite gates 215-217 and OR-NAND type composite gates 256 and 257 are used; and, as the third logic gate, inverters 312-317 are used. The second logic gate, for example, can be formed using an AND-OR type composite gate shown in FIG. 2 or an OR-NAND type composite gate shown in FIG. 3. Consequently, just as for the CLA circuits shown in FIGS. 1, 4-7, for the 6-bit CLA circuit shown in FIG. 8, it is possible to realize the CLA circuit without using a multi-input gate having 3 or more series stages of transistors inserted between the output terminal and the power source line or ground line. Consequently, just as in the CLA circuits shown in FIGS. 1, 4-7, it is also possible to reduce the circuit size and power consumption in this case.

Embodiment 7

In the following, a 6-bit CLA circuit pertaining to Embodiment 7 of this invention will be explained. The Equation (28) is a logic formula obtained by grouping the following three group items in Equation (27)

$(p_5 \cdot p_4 \cdot p_3 \cdot p_2) - (p_1 \cdot g_0 + g_1)$, $(p_5 \cdot p_4) \cdot (p_3 \cdot g_2 + g_3)$, $(p_5 \cdot g_4 + g_5)$ from the side of the first logic operation item, that is, from the left side of Equation (27). Then, in a reverse way, grouping and transformation are performed from the right side of Equation (27), and the following equation is obtained.

[Numerical Formula 24]

$$G = (p_5 \cdot p_4 \cdot p_3 \cdot p_2)(p_1 \cdot g_0 + g_1) + \{(p_5 \cdot p_4) \cdot (p_3 \cdot g_2 + g_3) + (p_5 \cdot g_4 + g_5)\} \quad (29)$$

By studying the constitution of Equation (29) obtained above, one can see that a 6-bit CLA circuit having a constitution different from that of the circuit shown in FIG. 8 can be formed using the two types of gates (first and second logic gates) or three types of gates (first logic gate-third logic gate).

Figure 9:
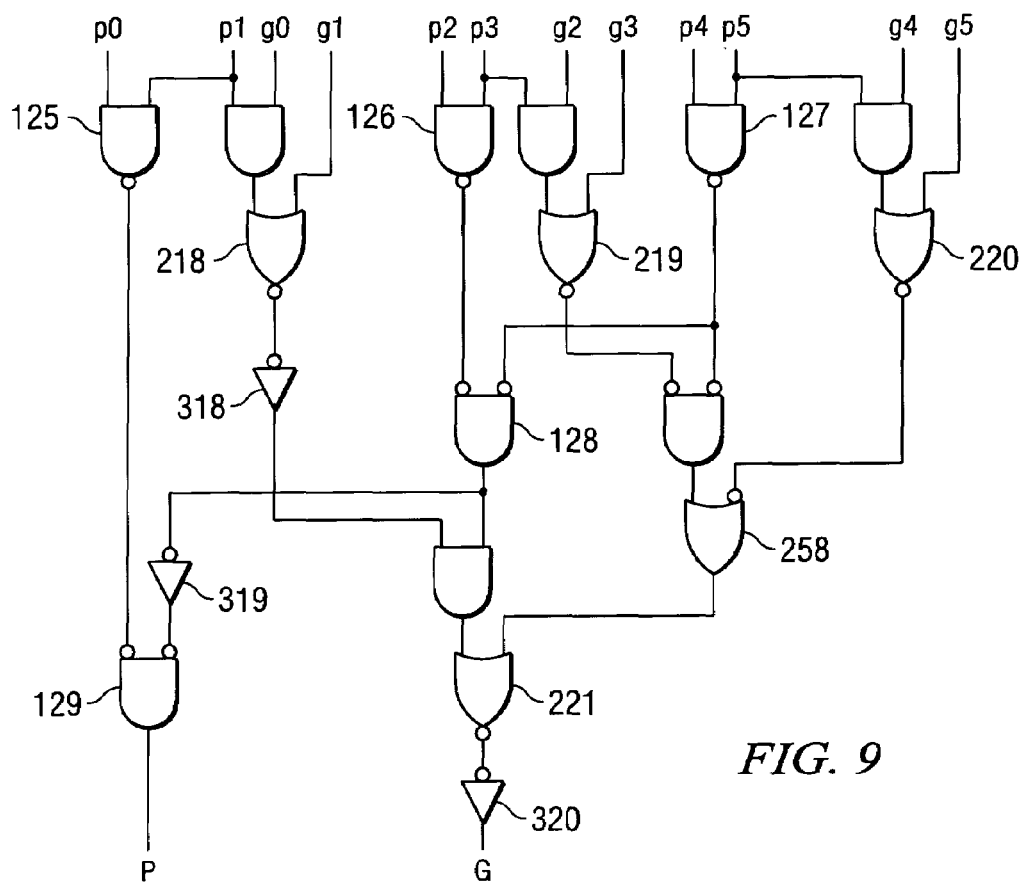
FIG. 9 is a circuit diagram illustrating an example of the constitution of the 6-bit CLA circuit pertaining to Embodiment 7 of this invention.

FIG. 9 is a circuit diagram illustrating an example of the constitution of the 6-bit CLA circuit in Embodiment 7 of this invention. The 6-bit CLA circuit shown in FIG. 9 has NAND gates 125-127, NOR gates 128 and 129, AND-NOR type composite gates 218-221, OR-NAND type composite gate 258, and inverters 318-320. NAND gates 125-127 as well as NOR gates 128 and 129 form an embodiment of the first logic gate of this invention. AND-NOR composite gates 218-221 as well as OR-NAND type composite gate 258 form an embodiment of the second logic gate of this invention. Inverters 318-320 form an embodiment of the third logic gate of this invention. NAND gate 125 has carry propagation signals $p_0$ and $p_1$ as its inputs, and outputs their NAND. NAND gate 126 takes carry propagation signals $p_2$ and $p_3$ as inputs, and outputs their NAND. NAND gate 127 takes carry propagation signals $p_4$ and $p_5$ as inputs, and outputs their NAND. NOR gate 128 outputs NOR of the output signals of NAND gates 126 and 127. This output signal corresponds to the result of operation for AND of the 4-bit carry propagation signal $(p_5 \cdot p_4 \cdot p_3 \cdot p_2)$ shown in Equation (29). Inverter 319 outputs NOT of the output signal of NOR gate 128. NOR gate 129 outputs NOR of the output signals of NAND gate 125 and inverter 319. This output signal corresponds to the result of operation for carry propagation signal P shown in Equation (26). AND-NOR type composite gate 218 takes carry generation signals $g_0$ and $g_1$ as well as carry propagation signal $p_1$ as inputs, and it outputs NOR of the AND of carry propagation signal $p_1$ and carry generation signal $g_0$ and the carry generation signal $g_1$. Inverter 318 outputs NOT of the output signal of AND-NOR type composite gate 218. This output signal corresponds to the result of operation for non-common item $(p_1 \cdot g_0 + g_1)$ in Equation (29). AND-NOR type composite gate 219 takes carry generation signals $g_2$ and $g_3$ as well as carry propagation signal $p_3$ as inputs, and it outputs NOR of the AND of carry propagation signal $p_3$ and carry generation signal $g_2$ and the carry generation signal $g_3$. This output signal corresponds to NOT of the result of operation for non-common item $(p_3 \cdot g_2 + g_3)$ in Equation (29). AND-NOR type composite gate 220 takes carry generation signals $g_4$, $g_5$ and carry propagation signal $p_5$ as inputs, and it outputs NOR of the AND of carry propagation signal $p_5$ and carry generation signal $g_4$ and the carry generation signal $g_5$. This output signal corresponds to the signal of NOT of the result of operation for the group item $(p_5 \cdot g_4 + g_5)$ in Equation (29). OR-NAND type composite gate 258 outputs NAND of OR of the output signals of AND-NOR type composite gate 219 and NAND gate 127 and the output signal of AND-NOR type composite gate 220. This output signal corresponds to the result of operation for the following group item in Equation (29):

$$\{(p_5 \cdot p_4) \cdot (p_3 \cdot g_2 + g_3) + (p_5 \cdot g_4 + g_5)\}$$

AND-NOR type composite gate 221 outputs NOR of the AND of the output signals of NOR gate 128 and inverter 318 and the output signal of OR-NAND type composite gate 258. Inverter 320 outputs NOT of the output signal of AND-NOR type composite gate 221. This output signal corresponds to the result of operation for carry generation signal G in Equation (29). Also, one may use the circuits shown in FIG. 2 or FIG. 3 for the AND-NOR type composite gates and OR-NAND type composite gate (218-221, 258) used in the CLA circuit shown in FIG. 9.

As explained above, in the 6-bit CLA circuit shown in FIG. 9, three types of logic gates (first logic gate to third logic gate) are used to form the circuit for output of carry generation signal G shown in Equation (25) and carry propagation signal P shown in Equation (26). That is, as the first logic gate, NAND gates 125-127, and NOR gates 128 and 129 are used. As the second logic gate, AND-NOR type composite gates 218-221 and OR-NAND type composite gate 258 are used. As the third logic gate, inverters 318-320 are used. For example, the second logic gate is formed using an AND-NOR type composite gate shown in FIG. 2 and an OR-NAND type composite gate shown in FIG. 3. Consequently, just as for the CLA circuits shown in FIGS. 1, 4-8, for the 6-bit CLA circuit shown in FIG. 9, it is possible to realize the CLA circuit without using a multi-input gate having 3 or more series stages of transistors inserted between the output terminal and the power source line or ground line. Consequently, just as for the CLA circuits shown in FIGS. 1, 4-8, it is also possible to reduce the circuit size and the power consumption in this case.

Embodiment 8

Figure 10:
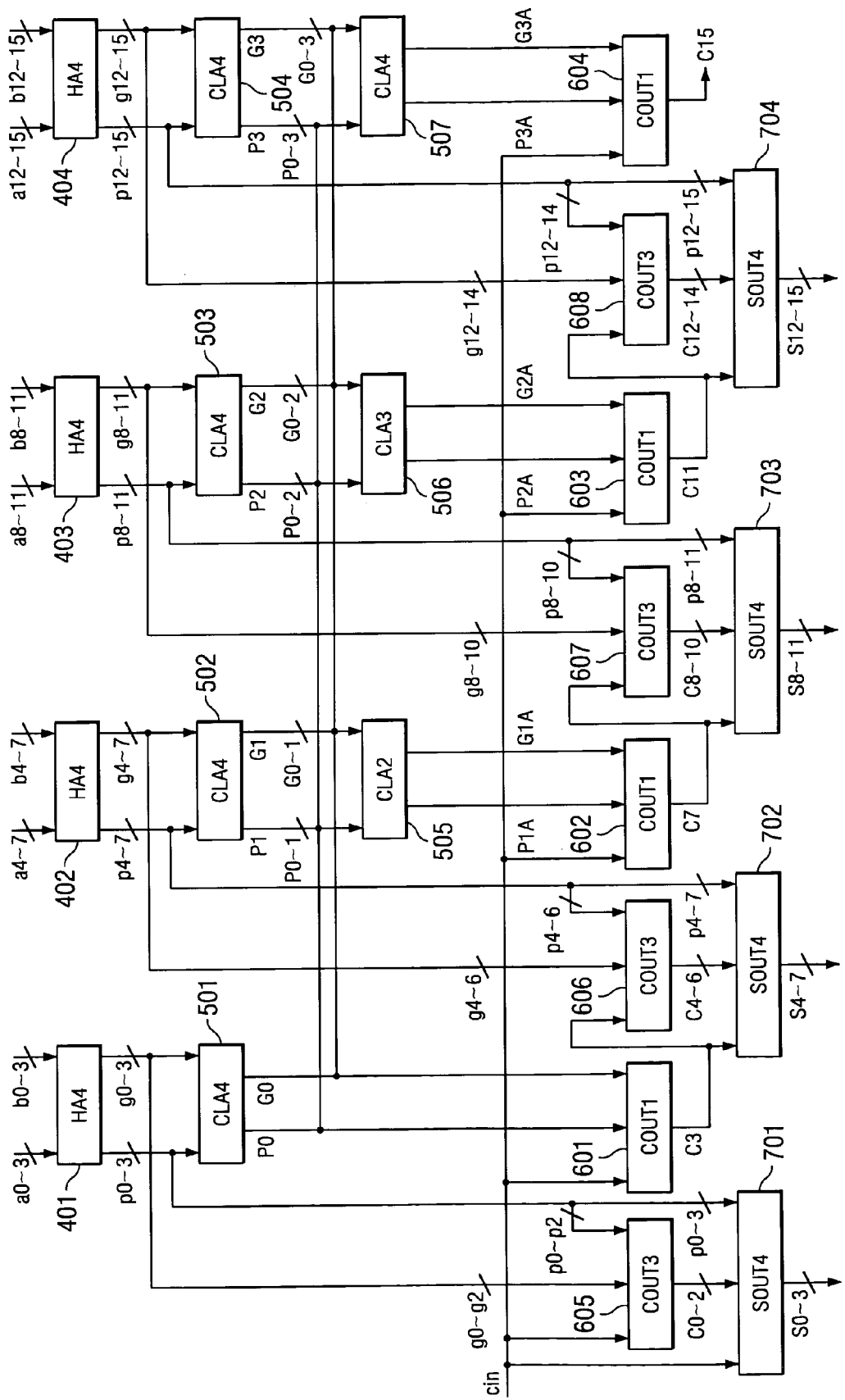
FIG. 10 is a block diagram illustrating an example of the constitution of a 16-bit adder pertaining to Embodiment 8 in this invention.

In the following, an adder in Embodiment 8 of this invention will be explained. FIG. 10 is a block diagram illustrating an example of the constitution of the 16-bit adder pertaining to Embodiment 8 of this invention. The 16-bit adder shown in FIG. 10 has 4-bit half adders 401-404, 4-bit CLA circuits 501-504 and 507, 2-bit CLA circuit 505, 3-bit CLA circuit 506, 1-bit carry output circuits 601-604, 3-bit carry output circuits 605-608, and addition result output circuits 701-704. The unit containing 4-bit half adders 401-404 is an embodiment of the first logic operation circuit of this invention. The unit containing 4-bit CLA circuits 501-504 and 507, 2-bit CLA circuit 505, 3-bit CLA circuit 506, 1-bit carry output circuits 601-604, and 3-bit carry output circuits 605-608 is an embodiment of the second logic operation circuit of this invention. The unit containing addition result output circuits 701-704 is an embodiment of the third logic operation circuit of this invention. 4-bit CLA circuits 501-504 and 507, 2-bit CLA circuit 505, and 3-bit CLA circuit 506 form an embodiment of the carry look-ahead circuit of this invention. The unit containing 1-bit carry output circuits 601-604 and 3-bit carry output circuits 605-608 is an embodiment of the carry signal output circuit of this invention.

Figure 19:
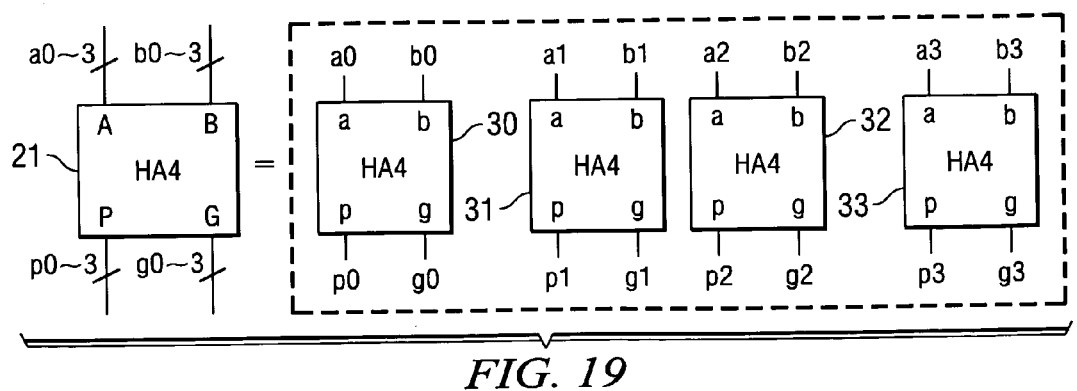
FIG. 19 is a circuit diagram illustrating an example of the constitution of a 4-bit half adder in the carry signal output circuit shown in FIG. 18.

4-bit half adders 401-404 have 4-bit signals obtained by dividing the 16-bit addition object signal into four portions as their inputs, and they calculate the carry propagation signal and carry generation signal expressed by Equations (4) and (5), respectively, for each position. More specifically, half adder 401 takes the addition object signals $(a_0, \ldots, a_3)$ and $(b_0, \ldots, b_3)$ of the least significant position (first position)-the fourth position as its input; half adder 402 takes the addition object signals $(a_4, \ldots, a_7)$ and $(b_4, \ldots, b_7)$ of the fifth position-eighth position as its input; half adder 403 takes the addition object signals $(a_8, \ldots, a_{11})$ and $(b_8, \ldots, b_{11})$ of the ninth position-$12^{th}$ position as its input; and half adder 404 takes the addition object signals $(a_{12}, \ldots, a_{15})$ and $(b_{12}, \ldots, b_{15})$ of the $13^{th}$ position-$16^{th}$ position as its input. Then, for each position of the input addition object signals, exclusive OR of Equation (4) and AND of Equation (5) are calculated. Half adder 401 calculates and outputs carry propagation signal $(p_0, \ldots, p_3)$ and carry generation signal $(g_0, \ldots, g_3)$; half adder 402 calculates and outputs carry propagation signal $(p_4, \ldots, p_7)$ and carry generation signal $(g_4, \ldots, g_7)$; half adder 403 calculates and outputs carry propagation signal $(p_8, \ldots, p_{11})$ and carry generation signal $(g_8, \ldots, g_{11})$; and half adder 404 calculates and outputs carry propagation signal $(p_12, \ldots, p_{15})$ and carry generation signal $(g_{12}, \ldots, g_{15})$. For example, as shown in FIG. 19, 4-bit half adders 401-404 each may be formed from four 1-bit half adders.

4-bit CLA circuits 501-504 have 4-bit carry propagation signals and 4-bit carry generation signals output from 4-bit half adders 401-404 as inputs, and they output corresponding 1-bit carry propagation signals and 1-bit carry generation signals, respectively. That is, CLA circuit 501 takes carry propagation signal $(p_0, \ldots, p_3)$ and carry generation signal $(g_0, \ldots, g_3)$ of half adder 401 as its input; CLA circuit 502 takes carry propagation signal $(p_4, \ldots, p_7)$ and carry generation signal $(g_4, \ldots, g_7)$ of half adder 402 as its input; CLA circuit (503) takes carry propagation signal $(p_8, \ldots, p_{11})$ and carry generation signal $(g_8, \ldots, g_{11})$ of half adder 403 as its input; and CLA circuit 504 takes carry propagation signal $(p_{12}, \ldots, p_{15})$ and carry generation signal $(g_{12}, \ldots, g_{15})$ of half adder 404 as its input. Then, corresponding to the input, the 1-bit carry propagation signal shown in Equation (7) and the 1-bit carry generation signal shown in Equation (8) are calculated. As the result of calculation, CLA circuit 501 outputs carry propagation signal $P_0$ and carry generation signal $G_0$, CLA circuit 502 outputs carry propagation signal $P_1$ and carry generation signal $G_1$, CLA circuit 503 outputs carry propagation signal $P_2$ and carry generation signal $G_2$, and CLA circuit 504 outputs carry propagation signal $P_3$ and carry generation signal $G_3$. The 4-bit CLA circuits of this invention can be used as the 4-bit CLA circuits 501-504. For example, the CLA circuit shown in FIG. 1 and explained in Embodiment 1 can be used.

2-bit CLA circuit 505 takes 2-bit carry propagation signal $(P_0, P_1)$ and 2-bit carry generation signal $(G_0, G_1)$ output from former-stage 4-bit CLA circuits 501 and 502 as input, and, corresponding to the signals, outputs 1-bit carry propagation signal $P_{1A}$ and 1-bit carry generation signal $G_{1A}$. Carry propagation signal $P_{1A}$ and carry generation signal $G_{1A}$ are expressed by the following equations.

[Numerical Formula 25]

$$G_{1A} = P_1 \cdot G_0 + G_1 \tag{30}$$

$$P_{1A} = P_1 \cdot P_0 \tag{31}$$

Figure 11:
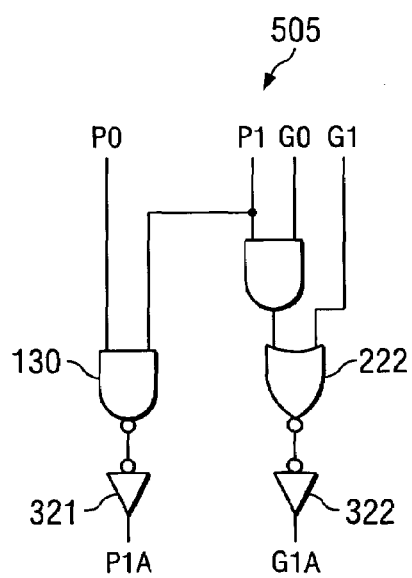
FIG. 11 is a circuit diagram illustrating an example of the constitution of the 2-bit CLA circuit in the adder shown in FIG. 10.

FIG. 11 is a circuit diagram illustrating an example of the constitution of 2-bit CLA circuit 505. 2-bit CLA circuit 505 shown in FIG. 11 has NAND gate 130, AND-NOR type composite gate 222, and inverters 321 and 322. NAND gate 130 outputs NAND of carry propagation signals $P_0$ and $P_1$. Inverter 321 outputs NOT of the output signal of NAND gate 130 as carry propagation signal $P_{1A}$. AND-NOR type composite gate 222 outputs NOR of the AND of carry propagation signal $P_1$ and carry generation signal $G_0$ and the carry generation signal $G_1$. The inverter outputs NOT of the output signal of AND-NOR type composite gate 222 as carry generation signal $G_{1A}$.

3-bit CLA circuit 506 takes 3-bit carry propagation signals $(P_0$-$P_2)$ and 3-bit carry generation signals $(G_0$-$G_2)$ output from former-stage 4-bit CLA circuits 501-503 as inputs, and, corresponding to these inputs, outputs 1-bit carry propagation signal $P_{2A}$ and 1-bit carry generation signal $G_{2A}$. Carry propagation signal $P_{2A}$ and carry generation signal $G_{2A}$ are expressed by the following equations.

[Numerical Formula 26]

$$G_{2A} = P_2 \cdot P_1 \cdot G_0 + P_2 \cdot G_1 + G_2 \tag{32}$$

$$P_{2A} = P_2 \cdot P_1 \cdot P_0 \tag{33}$$

Here, for the Equation (32), grouping and transformation are performed in the same way as for Equations (16), (19), (22) and (27). Grouping from the left side of Equation (23) leads to the following equation.

[Numerical Formula 27]

$$G_{2A} = P_2 \cdot (P_1 \cdot G_0 + G_1) + G_2 \tag{34}$$

Grouping from the right side of Equation (23) leads to the following equation.

[Numerical Formula 28]

$$G_{2A} = P_2 \cdot P_1 \cdot G_0 + \{P_2 \cdot G_1 + G_2\} \tag{35}$$

Figure 12A:
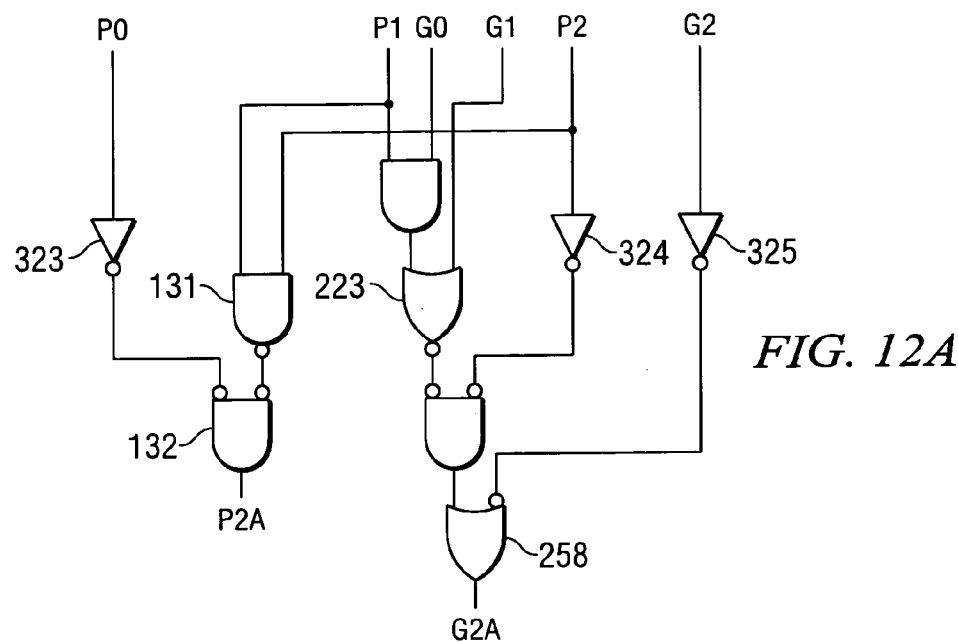
FIG. 12 is a circuit diagram illustrating two structural examples of the 3-bit CLA circuit in the adder shown in FIG. 10.
Figure 12B:
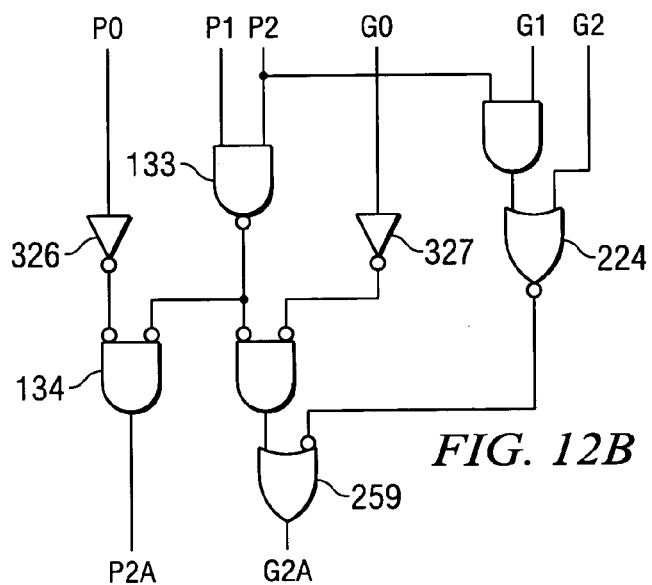

3-bit CLA circuit 506 corresponding to the constitution of Equation (34), for example, may have the constitution of the circuit shown in FIG. 12(A). 3-bit CLA circuit 506 shown in FIG. 12(A) has NAND gate 131, NOR gate 132, AND-NOR type composite gate 223, OR-NAND type composite gate 258, and inverters 323-325. Inverter 323 outputs NOT of carry propagation signal $P_0$. NAND gate 131 outputs NAND of carry propagation signals $P_1$ and $P_2$. NOR gate 132 outputs NOR of the output signals of inverter 323 and NAND gate 131. This output signal corresponds to the result of operation for carry propagation signal $P_{2A}$ shown in Equation (33). AND-NOR type composite gate 223 outputs NOR of the AND of carry propagation signal $P_1$ and carry generation signal $G_0$ and the carry generation signal $G_1$. This output signal corresponds to NOT of the result of the operation of non-common item $(P_1 \cdot G_0 + G_1)$ in Equation (34). Inverter 324 outputs NOT of carry propagation signal $P_2$. Inverter 325 outputs NOT of carry generation signal $G_2$. OR-NAND type composite gate 258 outputs NAND of the OR of the output signals of AND-NOR type composite gate 223 and inverter 324 and the output signal of inverter 325. This output signal corresponds to the result of operation for carry generation signal $G_{2A}$ shown in Equation (32). Also, 3-bit CLA circuit 506 corresponding to the constitution of Equation (35), for example, can be formed as the circuit shown in FIG. 12(B). 3-bit CLA circuit 506 shown in FIG. 12(B) has NAND gate 133, NOR gate 134, AND-NOR type composite gate 224, OR-NAND type composite gate 259, and inverters 326 and 327. Inverter 326 outputs NOT of carry propagation signal $P_0$. NAND gate 133 outputs NAND of carry propagation signals $P_1$ and $P_2$. NOR gate 134 outputs NOR of the output signals of inverter 326 and NAND gate 133. This output signal corresponds to the result of operation for carry propagation signal $P_{2A}$ shown in Equation (33). AND-NOR type composite gate 224 outputs NOR of the AND of carry propagation signal $P_2$ and carry generation signal $G_1$ and the carry generation signal $G_2$. This output signal corresponds to NOT of the result of operation for the group item $(P_2 \cdot G_1 + G_2)$ in Equation (35). Inverter 327 outputs NOT of carry generation signal $G_0$. OR-NAND type composite gate 259 outputs NAND of the OR of the output signals of NAND gate 133 and inverter 327 and the output signal of AND-NOR type composite gate 224. This output signal corresponds to the result of operation for carry generation signal $G_{2A}$ shown in Equation (32). Both CLA circuits shown in FIGS. 12(A) and (B) are formed from the first logic gate-third logic gate. That is, the CLA circuit shown in FIG. 12(A) uses NAND gate 131 and NOR gate 132 as the first logic gate, AND-NOR type composite gate 223 and OR-NAND type composite gate 258 as the second logic gate, and inverters 323-325 as the third logic gate. The CLA circuit shown in FIG. 12(B) uses NAND gate 133 and NOR gate 134 as the first logic gate, AND-NOR type composite gate 224 and OR-NAND type composite gate 259 as the second logic gate, and inverters 326 and 327 as the third logic gate. For example, the second logic gate may be realized with an AND-NOR type composite gate shown in FIG. 2 or an OR-NAND type composite gate shown in FIG. 3. Consequently, 3-bit CLA circuit 506 can have the circuit formed without using logic gates having 3 or more series stages of transistors inserted between the output terminal and power source line or ground line, such as a 3-input NAND gate, etc.

4-bit CLA circuit 507 takes 4-bit carry propagation signal $(P_0$-$P_3)$ and 4-bit carry generation signal $(G_0$-$G_3)$ output from the former-stage 4-bit CLA circuits 501-504, and, corresponding to the input, it outputs 1-bit carry propagation signal $P_{3A}$ and 1-bit carry generation signal $G_{3A}$. Carry propagation signal $P_{3A}$ and carry generation signal $G_{3A}$ are expressed by the following equations.

[Numerical Formula 29]

$$G_{3A} = P_3 \cdot P_2 \cdot P_1 \cdot G_0 + P_3 \cdot P_2 \cdot G_1 + P_3 \cdot G_2 + G_3 \tag{36}$$

$$P_{3A} = P_3 \cdot P_2 \cdot P_1 \cdot P_0 \tag{37}$$

A 4-bit CLA circuit pertaining to this invention is used as 4-bit CLA circuit 507. For example, as explained in Embodiment 1, the CLA circuit shown in FIG. 1 may be used.

1-bit carry output circuits 601-604 take the least significant position of the addition object signal as the first position, and they output carry signal $c_3$ of the fourth position, carry signal $c_7$ of the eighth position, carry signal $c_{11}$ of the $12^{th}$ position, and carry signal $c_{15}$ of the $16^{th}$ position, respectively. 1-bit carry output circuit 601 takes external carry signal $c_{in}$ given to the least significant position of the addition object signal as well as carry propagation signal $P_0$ and carry generation signal $G_0$ output from CLA circuit 501, and it outputs carry signal $c_3$ of the fourth position expressed by the following equation.

[Numerical Formula 30]

$$c_3 = P_0 \cdot c_{in} + G_0 \tag{38}$$
$$= p_3 \cdot p_2 \cdot p_1 \cdot p_0 \cdot c_{in} +$$
$$p_3 \cdot p_2 \cdot p_1 \cdot g_0 +$$
$$p_3 \cdot p_2 \cdot g_1 +$$
$$p_3 \cdot g_2 +$$
$$g_3$$

1-bit carry output circuit 602 takes external carry signal $c_{in}$ as well as carry propagation signal $P_{1A}$ and carry generation signal $G_{1A}$ output from CLA circuit 505, and it outputs carry signal $c_7$ of the eighth position expressed by the following equation.

[Numerical Formula 31]

$$c_7 = P_{1A} \cdot c_{in} + G_{1A} \tag{39}$$
$$= P_1 \cdot P_0 \cdot c_{in} + P_1 \cdot G_0 + G_1$$
$$= p_7 \cdot p_6 \cdot \cdots \cdot p_1 \cdot p_0 \cdot c_{in} +$$
$$p_7 \cdot p_6 \cdot \cdots \cdot p_1 \cdot g_0 +$$
$$\vdots$$
$$p_7 \cdot g_6 +$$
$$g_7$$

1-bit carry output circuit 603 takes external carry signal $c_{in}$ as well as carry propagation signal $P_{2A}$ and carry generation signal $G_{2A}$ output from CLA circuit 506, and it outputs carry signal $c_{11}$ of the $12^{th}$ position expressed by the following equation.

[Numerical Formula 32]

$$c_{11} = P_{2A} \cdot c_{in} + G_{2A} \tag{40}$$
$$= P_2 \cdot P_1 \cdot P_0 \cdot c_{in} + P_2 \cdot P_1 \cdot G_0 + P_2 \cdot G_1 + G_2$$
$$= p_{11} \cdot p_{10} \cdot \cdots \cdot p_1 \cdot p_0 \cdot c_{in} +$$
$$p_{11} \cdot p_{10} \cdot \cdots \cdot p_1 \cdot g_0 +$$
$$\vdots$$
$$p_{11} \cdot g_{10} +$$
$$g_{11}$$

1-bit carry output circuit 604 takes external carry signal $c_{in}$ as well as carry propagation signal $P_{3A}$ and carry generation signal $G_{3A}$ output from CLA circuit 507, and it outputs carry signal $c_{15}$ of the $16^{th}$ position expressed by the following equation.

[Numerical Formula 33]

$$c_{15} = P_{3A} \cdot c_{in} + G_{3A} \tag{41}$$
$$= P_3 \cdot P_2 \cdot P_1 \cdot P_0 \cdot c_{in} + P_3 \cdot P_2 \cdot P_1 \cdot G_0 + P_3 \cdot P_2 \cdot G_1 + P_3 \cdot G_2 + G_3$$
$$= p_{15} \cdot p_{14} \cdot \cdots \cdot p_1 \cdot p_0 \cdot c_{in} +$$
$$p_{15} \cdot p_{14} \cdot \cdots \cdot p_1 \cdot g_0 +$$
$$\vdots$$
$$p_{15} \cdot g_{14} +$$
$$g_{15}$$

Figure 13:
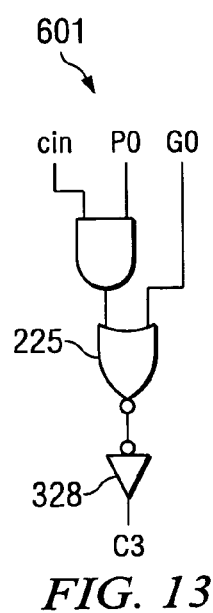
FIG. 13 is a circuit diagram illustrating an example of the constitution of the 1-bit carry output circuit in the adder shown in FIG. 10.

FIG. 13 is a circuit diagram illustrating an example of the constitution of 1-bit carry output circuit 601. 1-bit carry output circuit 601 shown in FIG. 13 has AND-NOR type composite gate 225 and inverter 328. AND-NOR type composite gate 225 outputs NAND of the AND of external carry signal $c_{in}$ and carry propagation signal $P_0$ and the carry generation signal $G_0$. Inverter 328 outputs NOT of the output signal of AND-NOR type composite gate 225 as carry signal $c_3$. Other 1-bit carry output circuits 602-604 can also be realized with the same circuit constitution as that shown in FIG. 13.

Figure 14:
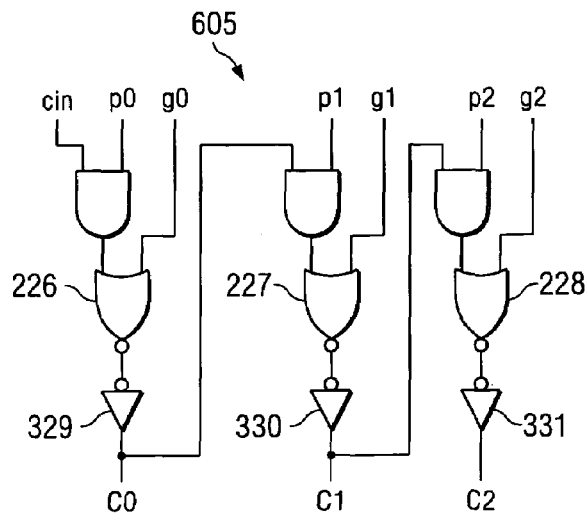
FIG. 14 is a circuit diagram illustrating an example of the constitution of the 3-bit carry output circuit in the adder shown in FIG. 10.
Figure 16A:
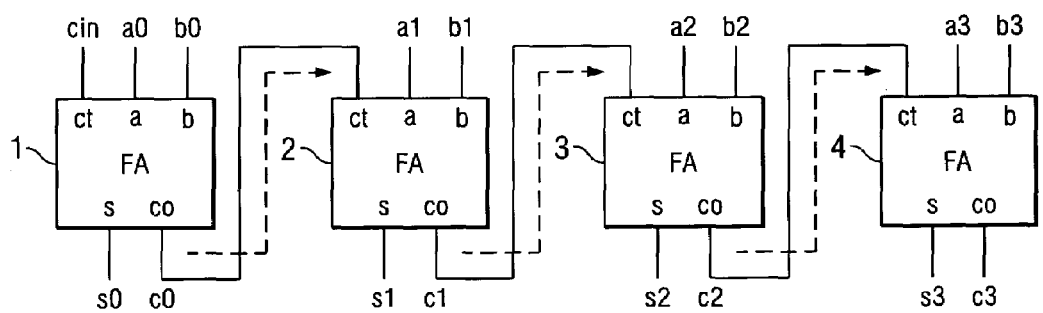
FIG. 16 is a circuit diagram illustrating an example of the constitution of a 4-input ripple carry type adder.
Figure 16B:
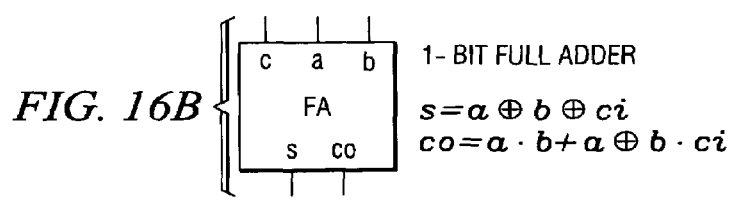
Figure 17A:
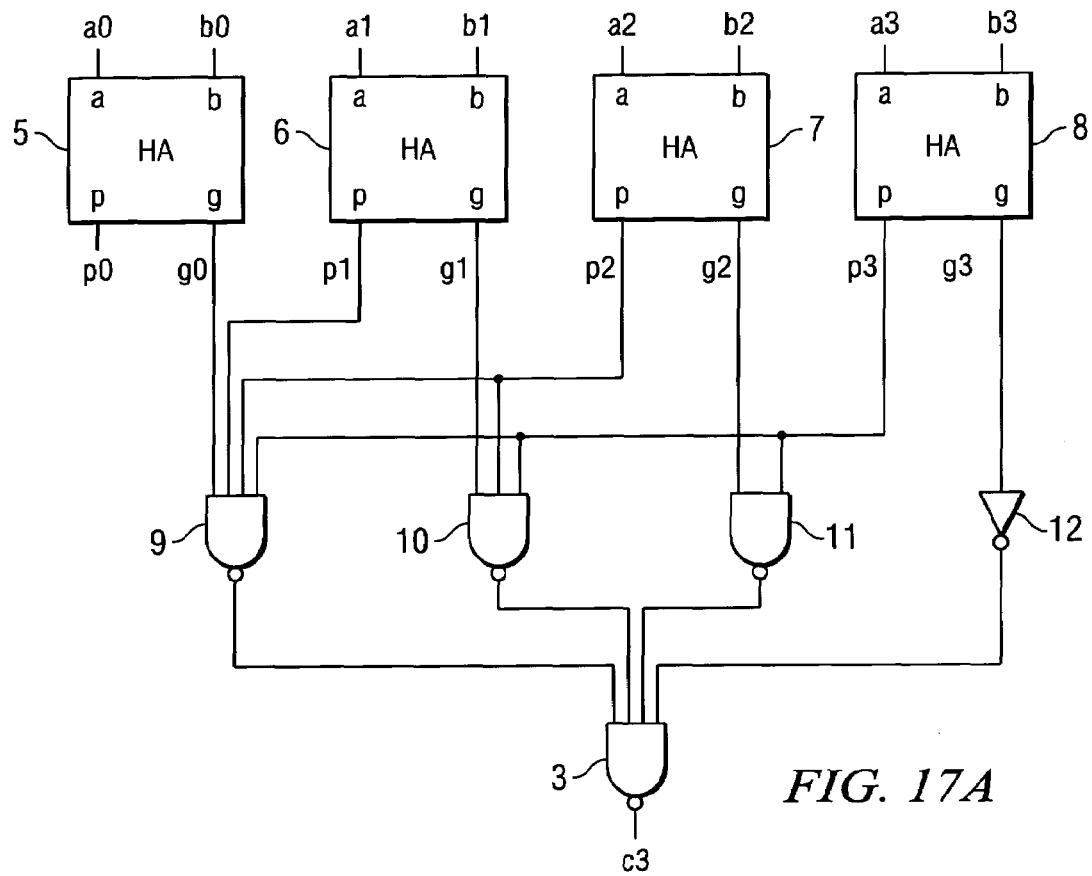
FIG. 17 is a circuit diagram illustrating an example of a carry signal generation circuit formed using multi-input gates.
Figure 17B:
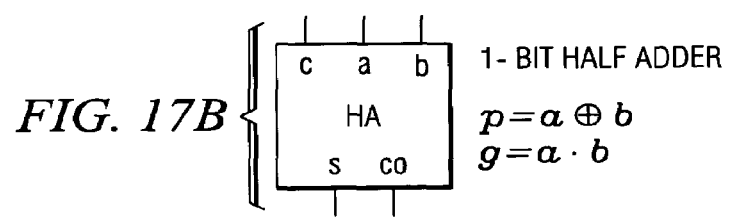
Figure 18:
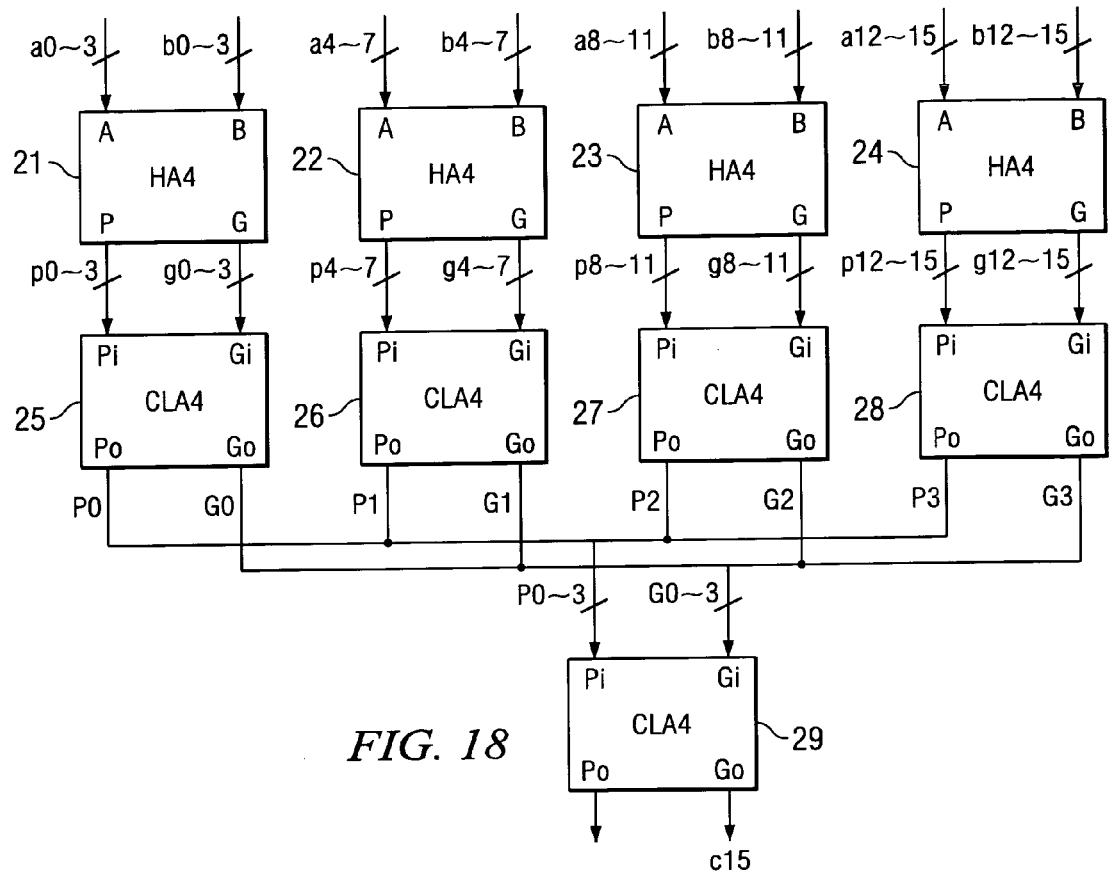
FIG. 18 is a circuit diagram illustrating an example of the generation circuit of a carry circuit formed by connecting plural CLA circuits in a hierarchical structure.

3-bit carry output circuits 605-608 output carry signals ($c_0$-$c_2$) of the first position-third position, carry signals ($c_4$-$c_6$) of the fifth position-seventh position, carry signals ($c_8$-$c_{10}$) of the ninth position-$11^{th}$ position, and carry signals ($c_{12}$-$c_{14}$) of the $13^{th}$ position-$15^{th}$ position. More specifically, 3-bit carry output circuit 605 takes the signals of the first-third positions ($p_0$-$p_2$, $g_0$-$g_2$) among the carry propagation signals and carry generation signals output from 4-bit half adder 401 as well as external carry signal $c_{in}$ as inputs, and it outputs carry signal ($c_0$-$c_2$) calculated with Equation (3A). Similarly, 3-bit carry output circuit 606 takes the signals of the fifth-seventh positions ($p_4$-$p_6$, $g_4$-$g_6$) among the carry propagation signals and carry generation signals output from 4-bit half adder 402 as well as carry signal $c_3$ of the fourth position output from 1-bit carry output circuit 601 as inputs, and it outputs carry signal ($c_4$-$c_6$) calculated with Equation (3A). 3-bit carry output circuit 607 takes the signals of the ninth-$11^{th}$ positions ($p_8$-$p_{10}$, $g_8$-$g_{10}$) among the carry propagation signals and carry generation signals output from 4-bit half adder 403 as well as carry signal $c_7$ of the eighth position output from 1-bit carry output circuit 602 as inputs, and it outputs carry signal ($c_8$-$c_{10}$) calculated with Equation (3A). 3-bit carry output circuit 608 takes the signals of the $13^{th}$-$15^{th}$ positions ($p_{12}$-$p_{14}$, $g_{12}$-$g_{14}$) among the carry propagation signals and carry generation signals output from 4-bit half adder 404 as well as carry signal $c_{11}$ of the $12^{th}$ position output from 1-bit carry output circuit 603 as inputs, and it outputs carry signal ($c_{12}$-$c_{14}$) calculated with Equation (3A). FIG. 14 is a circuit diagram illustrating an example of the constitution of 3-bit carry output circuit 605. 3-bit carry output circuit 605 shown in FIG. 14 has AND-NOR type composite gates 226-228 and inverters 329-331. AND-NOR type composite gate 226 outputs NOR of the AND of external carry signal $c_{in}$ and carry propagation signal $p_0$ and the carry generation signal $g_0$. Inverter 329 outputs NOT of the output signal of AND-NOR type composite gate 226 as carry signal $c_0$. AND-NOR type composite gate 227 outputs NOR of the AND of carry signal $c_0$ output from inverter 329 and carry propagation signal $p_1$ and the carry generation signal $g_1$. Inverter 330 outputs NOT of the output signal of AND-NOR type composite gate 227 as carry signal $c_1$. AND-NOR type composite gate 228 outputs NOR of the AND of carry signal $c_1$ output from inverter 330 and carry propagation signal $p_2$ and the carry generation signal $g_1$. Inverter 331 outputs NOT of the output signal of AND-NOR type composite gate 228 as carry signal $c_2$. 3-bit carry output circuit 605 shown in FIG. 14 generates carry signals sequentially from the lower position. This system is the same as that of the ripple carry type adder shown in FIG. 16. For the other 3-bit carry output circuits 606-608, too, the carry signal can be formed in the same way as that in the circuit shown in FIG. 14. The formula for calculating the carry signal ($c_1$, $c_5$, $c_9$, $c_{13}$) as the second from the lowest position output from 3-bit carry output circuits 605-608 has a constitution equivalent to Equation (32). Consequently, the circuit for generating these signals may have the same constitution as that of the circuit generating carry generation signal $G_{2A}$ in FIG. 12(A) or FIG. 12(B). The formula for calculating the carry signal ($c_2$, $c_6$, $c_{10}$, $c_{14}$) as the third from the lowest position output from 3-bit carry output circuits 605-608 has a constitution equivalent to Equation (14). Consequently, the circuit for generating these signals may have the same constitution as that of the circuit generating carry generation signal G in FIG. 1.

Addition result output circuits 701-704 calculate the exclusive OR of carry signals $c_{in}$, $c_0$, $c_1$, ..., $c_{14}$ from the lower position with respect to each position of the addition object signal and carry propagation signals $p_0$, ..., $p_{15}$ of the various positions, and it outputs the addition results of the various positions $s_0$, ..., $s_{15}$.

Figure 15:
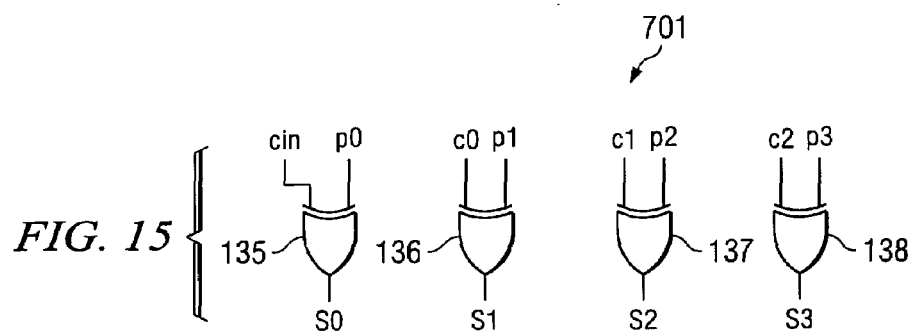
FIG. 15 is a circuit diagram illustrating an example of the constitution of the addition result output circuit in the adder shown in FIG. 10.

FIG. 15 is a circuit diagram illustrating an example of the constitution of addition result output circuit 701. As shown in FIG. 15, the addition result output circuit that outputs a 4-bit addition result may be formed form 4 EXOR gates. For the 16-bit adder with the constitution, CLA circuits 501-507 are used in forming the circuits that generate the carry signals• ($c_3$, $c_7$, $c_{11}$, $c_{15}$) of the fourth position, eighth position, $12^{th}$ position and $16^{th}$ position, respectively. All of these CLA circuits are composed of two types of logic gates (first logic gate, second logic gate) or three types of logic gates (first logic gate-third logic gate). As described above, in the first logic gate-third logic gate, the number of series stages of transistors inserted between the output terminal and the power source line or ground line is 2 or less. Consequently, compared with a multi-input NAND gate or NOR gate having the same operation speed, the transistor size can be reduced. Consequently, for the adder shown in FIG. 10, compared with a conventional adder composed of a CLA circuit using multi-input gates having 3 or more series stages of transistors, while the operation speed is similar, the circuit size is smaller, and the power consumption becomes lower. On the other hand, when the transistor size is increased to have a similar circuit size, the operation speed can be higher than that of the conventional adder.

In the embodiments described above, CLA circuits for 3-6 bits and the adder using them have been explained. However, this invention is not limited to this scheme. One may form CLA circuits for any [number of] bits from two types of logic gates (first logic gate, second logic gate) or three types of logic gates (first logic gate-third logic gate). For example, the least significant positions of the N-bit carry propagation signal ($p_{(N-1)}$-$p_0$) and N-bit carry generation signal ($g_{(N-1)}$-$g_0$) input to the CLA circuit are taken as the first position. AND of the various positions from the Nth position to kth position (where k is a natural number of 2-N) of the input carry propagation signal and the (k−1)th position of the input carry generation signal is taken as the (k−1)th logic operation item, and the Nth position of the input carry generation signal is taken as the Nth logic operation item. In this case, as shown in Equation (12), carry generation signal G output from the CLA circuit is obtained as a result of OR of the first logic operation item-Nth logic operation item. Also, as shown in Equation 13, carry propagation signal P output from the CLA circuit is obtained as a result of the operation of AND of the various positions from the first position to the Nth position of the input carry propagation signal. For the OR operation formulas of N items of the first logic operation item to the Nth logic operation item set side-by-side in order (operation formula for carry generation signal G), the following transformation is performed to obtain a logic formula having a constitution corresponding to the CLA circuit of this invention. First of all, grouping is performed with OR of every two adjacent items taken as a group item sequentially from the side of the first logic operation item to the side of the Nth logic operation item. When a common item exists in the two grouped items, OR of the two items in the group item is transformed to AND of the common item and the non-common item. If the number of group items in the grouped OR operation formula is larger than 2, the grouping and deformation are further performed repeatedly with respect to the group items set side-by-side corresponding to the numerical order of the first logic operation item-Nth logic operation item in the grouped OR operation formula. By means of the transformation, an OR operation formula composed of two group items (first logic formula) is obtained. The first logic gate takes 2-bit signals as input, and outputs AND, NAND, OR or NOR of the input 2-bit signals.

In the embodiments, examples have been described in which 2-input NAND gates and 2-input NOR gates are taken as the first logic gate. However, one may also use 2-input AND gates and 2-input OR gates. For any of the gates used, as needed, by means of combination of the third logic gate and first logic gate, it is possible to calculate AND of a plural-bit input carry propagation signal that is needed for calculation of carry propagation signal P and calculation of the common item in the first logic formula. The input signals of the first logic gate include signals corresponding to AND, NAND, OR and NOR of plural-bit input carry propagation signals (such as the output signal of another first logic gate), as well as input carry propagation signals and input carry generation signals. Also, the output signal of the third logic gate may also be input. The second logic gate takes 3-bit signals as input, and it outputs a signal corresponding to OR or NOR of the AND of 2-bit signals among the input signals and other 1-bit signals, or it outputs a signal corresponding to AND or NAND of the OR of 2-bit signals among the input signals and other 1-bit signals.

In the embodiments, AND-NOR type composite gates and OR-NAND type composite gates were shown as examples of the second logic gate. However, one may also use AND-OR type composite gates and OR-AND type composite gates. For any gate used in this case, as needed, by means of combination of the third logic gate and the second logic gate, it is possible to calculate carry generation signal G, and it is possible to calculate OR of AND of two signals and 1 signal needed for calculation of the group item and non-common item in the first logic formula. The inputs to the second logic gate include signals corresponding to results of calculation of the group item, common item, and non-common item in the first logic formula, as well as an input carry generation signal, input carry propagation signal, and the output signal of the first logic gate. Also, the output signal of the third logic gate may be input. The output signal of the second logic gate is output as the result of operation for the group item or non-common item in the first logic formula, or as the result of operation for the output carry generation signal. The third logic gate is an inverter that outputs NOT of a 1-bit signal as the input signal. The input signals of the third logic gate include an input carry generation signal, input carry propagation signal, output signal of the first logic gate, and output signal of the second logic gate. The output signal of the third logic gate is output to the first logic gate and the second logic gate. Also, it is output as the result of operation for the output carry propagation signal and the output carry generation signal. The carry look-ahead circuit and adder of this invention have the effects of smaller circuit size and lower power consumption.

The invention claimed is:

1. A 4-bit carry look ahead circuit forming a combined propagate signal and a combined generated signal comprising:
   a first NAND gate (101) having a first input receiving a propagate signal from the first bit, a second input receiving a propagate signal from the second bit and an output;
   a second NAND gate (102) having a first input receiving a propagate signal from the third bit, a second input receiving a propagate signal from the fourth bit and an output;
   a NOR gate (103) having a first input connected to said output of said first NAND gate, a second input connected to said output of said second NAND gate and an output forming the combined propagate signal for the four bits;
   a first AND-NOR gate (201) having a first AND input receiving a generate signal from the first bit, a second AND input receiving a propagate signal from the second bit, a NOR input receiving a generate signal from the second bit and an output;
   a second AND-NOR gate (202) having a first AND input receiving a generate signal from the third bit, a second AND input receiving a propagate signal from the fourth bit, a NOR input receiving a generate signal from the fourth bit and an output; and
   a OR-NAND gate (251) having a first OR input connected to said output of said first AND-NOR gate, a second OR input connected to said output of said second NAND gate, a NAND input connected to said output of said second AND-NOR gate and an output forming the combined generate signal for the four bits.

2. The carry look ahead circuit of claim 1, wherein:
   said first and second AND-NOR gates include
      a first P-channel transistor having a source-drain path connected between a supply voltage and an first intermediate node and a gate connected to said first AND input,
      a second P-channel transistor having a source-drain path connected between a supply voltage and said first intermediate node and a gate connected to said second AND input,
      a third P-channel transistor having a source-drain path connected between said first intermediate node and the output and a gate connected to said NOR input,
      a first N-channel transistor having a source-drain path connected between said output and a second intermediate node and a gate connected to said first AND input,
      a second N-channel transistor having a source-drain path connected between said second intermediate node and ground and a gate connected to said second AND input, and
      a third N-channel transistor having a source-drain path connected between said output and ground and a gate connected to said NOR input.

3. The carry look ahead circuit of claim 1, wherein:
   said first and second AND-NOR gates include
      a first P-channel transistor having a source-drain path connected between a supply voltage and an first intermediate node and a gate connected to said NOR input,
      a second P-channel transistor having a source-drain path connected between a supply voltage and said first intermediate node and said output and a gate connected to said first AND input,
      a third P-channel transistor having a source-drain path connected between said first intermediate node and said output and a gate connected to said second AND input,
      a first N-channel transistor having a source-drain path connected between said output and a second intermediate node and a gate connected to said first AND input,
      a second N-channel transistor having a source-drain path connected between said second intermediate node and ground and a gate connected to said second AND input, and
      a third N-channel transistor having a source-drain path connected between said output and ground and a gate connected to said NOR input.

4. The carry look ahead circuit of claim 1, wherein:
   said OR-NAND gate includes
      a first P-channel transistor having a source-drain path connected between a supply voltage and an first intermediate node and a gate connected to said second OR input,
      a second P-channel transistor having a source-drain path connected between said first intermediate node and said output and a gate connected to said first OR input,
      a third P-channel transistor having a source-drain path connected between the supply voltage and said output and a gate connected to said NAND input,
      a first N-channel transistor having a source-drain path connected between said output and a second intermediate node and a gate connected to said OR input,
      a second N-channel transistor having a source-drain path connected between said second intermediate node and ground and a gate connected to said first OR input, and
      a third N-channel transistor having a source-drain path connected between said second intermediate node and ground and a gate connected to said second OR input.

5. The carry look ahead circuit of claim 1, wherein:
   said OR-NAND gate includes
      a first P-channel transistor having a source-drain path connected between a supply voltage and an first intermediate node and a gate connected to said second OR input,
      a second P-channel transistor having a source-drain path connected between said first intermediate node and said output and a gate connected to said first OR input,
      a third P-channel transistor having a source-drain path connected between the supply voltage and said output and a gate connected to said NAND input,
      a first N-channel transistor having a source-drain path connected between said output and a second intermediate node and a gate connected to said first OR input, a second N-channel transistor having a source-drain path connected between said output and said second intermediate node and a gate connected to said second OR input, and a third N-channel transistor having a source-drain path connected between said second intermediate node and ground and a gate connected to said NAND input.

6. A 5-bit carrylook ahead circuit forming a combined-propagate signal and a combined generated signal comprising:

a first NAND gate (104) having a first input receiving a propagate signal from the first bit, a second input receiving a propagate signal from the second bit and an output;

a second NAND gate (105) having a first input receiving a propagate signal from the third bit, a second input receiving a propagate signal from the fourth bit and an output;

a first NOR gate (106) having a first input connected to said output of said first NAND gate, a second input connected to said output of said second NAND gate and an output;

a second NOR gate (107) having a first input connected to said output of said first NOR gate, a second input receiving a propagate signal from the fifth bit and an output;

a first inverter (301) having a input connected to said output of said second NOR gate and an output generating the combined propagate signal for the five bits;

a first AND-NOR gate (203) having a first AND input receiving a generate signal from the first bit, a second AND input receiving a propagate signal from the second bit, a NOR input receiving a generate signal from the second bit and an output;

a second AND-NOR gate (204) having a first AND input receiving a generate signal from the third bit, a second AND input receiving a propagate signal from the fourth bit, a NOR input receiving a generate signal from the fourth bit and an output;

a OR-NAND gate (252) having a first OR input connected to said output of said first AND-NOR gate, a second OR input connected to said output of said second NAND gate, a NAND input connected to said output of said second AND-NOR gate and an output forming the combined generate signal for the four bits;

a third AND-NOR gate (205) having a first AND input connected to said output of said OR-NAND gate, a second AND input receiving a propagate signal from the fifth bit, a NOR input receiving a generate signal from the fifth bit and an output; and a second inverter (302) having an input connected to said output of said third AND-NOR gate and an output generating the combined generate signal for the five bits.

7. The carry look ahead circuit of claim 6, wherein:

said first, second and third AND-NOR gates include a first P-channel transistor having a source-drain path connected between a supply voltage and an first intermediate node and a gate connected to said first AND input, a second P-channel transistor having a source-drain path connected between a supply voltage and said first intermediate node and a gate connected to said second AND input, a third P-channel transistor having a source-drain path connected between said first intermediate node and the output and a gate connected to said NOR input, a first N-channel transistor having a source-drain path connected between said output and a second intermediate node and a gate connected to said first AND input, a second N-channel transistor having a source-drain path connected between said second intermediate node and ground and a gate connected to said second AND input, and a third N-channel transistor having a source-drain path connected between said output and ground and a gate connected to said NOR input.

8. The carry look ahead circuit of claim 6, wherein:

said first, second and third AND-NOR gates include a first P-channel transistor having a source-drain path connected between a supply voltage and an first intermediate node and a gate connected to said NOR input, a second P-channel transistor having a source-drain path connected between a supply voltage and said first intermediate node and said output and a gate connected to said first AND input, a third P-channel transistor having a source-drain path connected between said first intermediate node and said output and a gate connected to said second AND input, a first N-channel transistor having a source-drain path connected between said output and a second intermediate node and a gate connected to said first AND input, a second N-channel transistor having a source-drain path connected between said second intermediate node and ground and a gate connected to said second AND input, and a third N-channel transistor having a source-drain path connected between said output and ground and a gate connected to said NOR input.

9. The carry look ahead circuit of claim 6, wherein:

said OR-NAND gate includes a first P-channel transistor having a source-drain path connected between a supply voltage and an first intermediate node and a gate connected to said second OR input, a second P-channel transistor having a source-drain path connected between said first intermediate node and said output and a gate connected to said first OR input, a third P-channel transistor having a source-drain path connected between the supply voltage and said output and a gate connected to said NAND input, a first N-channel transistor having a source-drain path connected between said output and a second intermediate node and a gate connected to said OR input, a second N-channel transistor having a source-drain path connected between said second intermediate node and ground and a gate connected to said first OR input, and a third N-channel transistor having a source-drain path connected between said second intermediate node and ground and a gate connected to said second OR input.

10. The carry look ahead circuit of claim 6, wherein:

said OR-NAND gate includes a first P-channel transistor having a source-drain path connected between a supply voltage and an first intermediate node and a gate connected to said second OR input, a first N-channel transistor having a source-drain path connected between said output and a second intermediate node and a gate connected to said first OR input, a second P-channel transistor having a source-drain path connected between said first intermediate node and said output and a gate connected to said first OR input, a third P-channel transistor having a source-drain path connected between the supply voltage and said output and a gate connected to said NAND input, a second N-channel transistor having a source-drain path connected between said output and said second intermediate node and a gate connected to said second OR input, and a third N-channel transistor having a source-drain path connected between said second intermediate node and ground and a gate connected to said NAND input.

11. A 5-bit carry look ahead circuit forming a combined propagate signal and a combined generated signal comprising:

a first NAND gate (108) having a first input receiving a propagate signal from the first bit, a second input receiving a propagate signal from the second bit and an output;

a second NAND gate (109) having a first input receiving a propagate signal from the third bit, a second input receiving a propagate signal from the fourth bit and an output;

a first inverter (303) having an input connected to said output of said second NAND gate and an output;

a third NAND gate (119) having a first input connected to said output of said first inverter, a second input receiving a propagate signal from the fifth bit and an output;

a NOR gate (111) having a first input connected to said output of said first NAND gate, a second input connected to said output of said third NAND gate and an output generating the combined propagate signal for the five bits;

a first AND-NOR gate (206) having a first AND input receiving a generate signal from the first bit, a second AND input receiving a propagate signal from the second bit, a NOR input receiving a generate signal from the second bit and an output;

a second AND-NOR (207) gate having a first AND input receiving a generate signal from the third bit, a second AND input receiving a propagate signal from the fourth bit, a NOR input receiving a generate signal from the fourth bit and an output;

a second inverter (304) having an input connected to said output of said second AND-NOR gate and an output;

a third AND-NOR gate (208) having a first AND input connected to said output of said second inverter, a second AND input receiving a propagate signal from the fifth bit, a NOR input receiving a generate signal from the fifth bit and an output; and a OR-NAND gate (253) having a first OR input connected to said output of said first AND-NOR gate, a second OR input connected to said output of said third AND-NOR gate, a NAND input connected to said output of said third AND-NOR gate and an output forming the combined generate signal for the four bits.

12. The carry look ahead circuit of claim 11, wherein:
said first, second and third AND-NOR gates include
a first P-channel transistor having a source-drain path connected between a supply voltage and an first intermediate node and a gate connected to said first AND input, a second P-channel transistor having a source-drain path connected between a supply voltage and said first intermediate node and a gate connected to said second AND input, a third P-channel transistor having a source-drain path connected between said first intermediate node and the output and a gate connected to said NOR input, a first N-channel transistor having a source-drain path connected between said output and a second intermediate node and a gate connected to said first AND input, a second N-channel transistor having a source-drain path connected between said second intermediate node and ground and a gate connected to said second AND input, and a third N-channel transistor having a source-drain path connected between said output and ground and a gate connected to said NOR input.

13. The carry look ahead circuit of claim 11, wherein:
said first, second and third AND-NOR gates include
a first P-channel transistor having a source-drain path connected between a supply voltage and an first intermediate node and a gate connected to said NOR input, a second P-channel transistor having a source-drain path connected between a supply voltage and said first intermediate node and said output and a gate connected to said first AND input, a third P-channel transistor having a source-drain path connected between said first intermediate node and said output and a gate connected to said second AND input, a first N-channel transistor having a source-drain path connected between said output and a second intermediate node and a gate connected to said first AND input, a second N-channel transistor having a source-drain path connected between said second intermediate node and ground and a gate connected to said second AND input, and a third N-channel transistor having a source-drain path connected between said output and ground and a gate connected to said NOR input.

14. The carry look ahead circuit of claim 11, wherein:
said OR-NAND gate includes
a first P-channel transistor having a source-drain path connected between a supply voltage and an first intermediate node and a gate connected to said second OR input, a second P-channel transistor having a source-drain path connected between said first intermediate node and said output and a gate connected to said first OR input, a third P-channel transistor having a source-drain path connected between the supply voltage and said output and a gate connected to said NAND input, a first N-channel transistor having a source-drain path connected between said output and a second intermediate node and a gate connected to said OR input, a second N-channel transistor having a source-drain path connected between said second intermediate node and ground and a gate connected to said first OR input, and a third N-channel transistor having a source-drain path connected between said second intermediate node and ground and a gate connected to said second OR input.

15. The carry look ahead circuit of claim 11, wherein:
said OR-NAND gate includes
a first P-channel transistor having a source-drain path connected between a supply voltage and an first intermediate node and a gate connected to said second OR input, a second P-channel transistor having a source-drain path connected between said first intermediate node and said output and a gate connected to said first OR input, a third P-channel transistor having a source-drain path connected between the supply voltage and said output and a gate connected to said NAND input, a first N-channel transistor having a source-drain path connected between said output and a second intermediate node and a gate connected to said first OR input, a second N-channel transistor having a source-drain path connected between said output and said second intermediate node and a gate connected to said second OR input, and a third N-channel transistor having a source-drain path connected between said second intermediate node and ground and a gate connected to said NAND input.

16. A 5-bit carry look ahead circuit forming a combined propagate signal and a combined generated signal comprising:

a first NAND gate (112) having a first input receiving a propagate signal from the second bit, a second input receiving a propagate signal from the third bit and an output;

a second NAND gate (113) having a first input receiving a propagate signal from the fourth bit, a second input receiving a propagate signal from the fifth bit and an output;

a NOR gate (114) having a first input connected to said output of said first NAND gate, a second input connected to said output of said second NAND gate and an output;

a third NAND gate (115) having a first input receiving the propagate signal from the first bit, a second input connected yo said output of said NOR gate and an output;

a first inverter (305) having an input connected to said output of said third NAND gate and an output generating the combined propagate signal for the five bits;

a first AND-NOR gate (209) having a first AND input receiving a propagate signal from the third bit, a second AND input receiving a generate signal from the second bit, a NOR input receiving a generate signal from the third bit and an output;

a second AND-NOR (210) gate having a first AND input receiving a propagate signal from the fifth bit, a second AND input receiving a generate signal from the fourth bit, a NOR input receiving a generate signal from the fifth bit and an output;

a OR-NAND gate (254) having a first OR input connected to said output of said first AND-NOR gate, a second OR input connected to said output of said second NAND gate, a NAND input connected to said output of said first AND-NOR gate and an output;

a third AND-NOR gate (211) having a first AND input connected to said output of said NOR gate, a second AND input receiving a generate signal from the first bit, a NOR input connected to said output of said OR-NAND gate and an output; and a second inverter (306) having an input connected to said output of said third AND-NOR gate and an output generation the combined generate signal for the five bits.

17. The carry look ahead circuit of claim 16, wherein:
said first, second and third AND-NOR gates include
a first P-channel transistor having a source-drain path connected between a supply voltage and an first intermediate node and a gate connected to said first AND input, a second P-channel transistor having a source-drain path connected between a supply voltage and said first intermediate node and a gate connected to said second AND input, a third P-channel transistor having a source-drain path connected between said first intermediate node and the output and a gate connected to said NOR input, a first N-channel transistor having a source-drain path connected between said output and a second intermediate node and a gate connected to said first AND input, a second N-channel transistor having a source-drain path connected between said second intermediate node and ground and a gate connected to said second AND input, and a third N-channel transistor having a source-drain path connected between said output and ground and a gate connected to said NOR input.

18. The carry look ahead circuit of claim 16, wherein:
said first, second and third AND-NOR gates include
a first P-channel transistor having a source-drain path connected between a supply voltage and an first intermediate node and a gate connected to said NOR input, a second P-channel transistor having a source-drain path connected between a supply voltage and said first intermediate node and said output and a gate connected to said first AND input, a third P-channel transistor having a source-drain path connected between said first intermediate node and said output and a gate connected to said second AND input, a first N-channel transistor having a source-drain path connected between said output and a second intermediate node and a gate connected to said first AND input, a second N-channel transistor having a source-drain path connected between said second intermediate node and ground and a gate connected to said second AND input, and a third N-channel transistor having a source-drain path connected between said output and ground and a gate connected to said NOR input.

19. The carry look ahead circuit of claim 16, wherein:
said OR-NAND gate includes
a first P-channel transistor having a source-drain path connected between a supply voltage and an first intermediate node and a gate connected to said second OR input, a second P-channel transistor having a source-drain path connected between said first intermediate node and said output and a gate connected to said first OR input, a third P-channel transistor having a source-drain path connected between the supply voltage and said output and a gate connected to said NAND input, a first N-channel transistor having a source-drain path connected between said output and a second intermediate node and a gate connected to said OR input, a second N-channel transistor having a source-drain path connected between said second intermediate node and ground and a gate connected to said first OR input, and a third N-channel transistor having a source-drain path connected between said second intermediate node and ground and a gate connected to said second OR input.

20. The carry look ahead circuit of claim 16, wherein:
said OR-NAND gate includes
a first P-channel transistor having a source-drain path connected between a supply voltage and an first intermediate node and a gate connected to said second OR input, a second P-channel transistor having a source-drain path connected between said first intermediate node and said output and a gate connected to said first OR input,
a third P-channel transistor having a source-drain path connected between the supply voltage and said output and a gate connected to said NAND input,
a first N-channel transistor having a source-drain path connected between said output and a second intermediate node and a gate connected to said first OR input,
a second N-channel transistor having a source-drain path connected between said output and said second intermediate node and a gate connected to said second OR input, and
a third N-channel transistor having a source-drain path connected between said second intermediate node and ground and a gate connected to said NAND input.

21. A 5-bit carry look ahead circuit forming a combined propagate signal and a combined generated signal comprising:
  a first NAND gate (116) having a first input receiving a propagate signal from the second bit, a second input receiving a propagate signal from the third bit and an output;
  a second NAND gate (117) having a first input receiving a propagate signal from the fourth bit, a second input receiving a propagate signal from the fifth bit and an output;
  a NOR gate (118) having a first input connected to said output of said first NAND gate, a second input connected to said output of said second NAND gate and an output;
  a third NAND gate (119) having a first input receiving the propagate signal from the first bit, a second input connected to said output of said NOR gate and an output;
  a first inverter (310) having an input connected to said output of said third NAND gate and an output generating the combined propagate signal for the five bits;
  a first AND-NOR gate (212) having a first AND input receiving a propagate signal from the third bit, a second AND input receiving a generate signal from the second bit, a NOR input receiving a generate signal from the third bit and an output;
  a second AND-NOR (213) gate having a first AND input receiving a propagate signal from the fifth bit, a second AND input receiving a generate signal from the fourth bit, a NOR input receiving a generate signal from the fifth bit and an output;
  a second inverter (307) having an input receiving a generate signal from the first bit and an output;
  a OR-NAND gate (255) having a first OR input connected to said output of said first NAND gate, a second OR input connected to said output of said second inverter, a NAND input connected to said output of said first AND-NOR gate and an output;
  a third inverter (308) having an input connected to said output of said second NAND gate and an output;
  a fourth inverter (309) having an input connected to said output of said second AND-NOR gate and an output;
  a third AND-NOR (214) gate having a first AND input connected to said output of said OR-NAND gate, a second AND input connected to said output of said third inverter, a NOR input connected to said output of said fourth inverter and an output; and
  a fifth inverter (311) having an input connected to said output of said third AND-NOR gate and an output generating the combined generate signal for the five bits.

22. The carry look ahead circuit of claim 21, wherein:
said first, second and third AND-NOR gates include
  a first P-channel transistor having a source-drain path connected between a supply voltage and an first intermediate node and a gate connected to said first AND input,
  a second P-channel transistor having a source-drain path connected between a supply voltage and said first intermediate node and a gate connected to said second AND input,
  a third P-channel transistor having a source-drain path connected between said first intermediate node and the output and a gate connected to said NOR input,
  a first N-channel transistor having a source-drain path connected between said output and a second intermediate node and a gate connected to said first AND input,
  a second N-channel transistor having a source-drain path connected between said second intermediate node and ground and a gate connected to said second AND input, and
  a third N-channel transistor having a source-drain path connected between said output and ground and a gate connected to said NOR input.

23. The carry look ahead circuit of claim 21, wherein:
said first, second and third AND-NOR gates include
  a first P-channel transistor having a source-drain path connected between a supply voltage and an first intermediate node and a gate connected to said NOR input,
  a second P-channel transistor having a source-drain path connected between a supply voltage and said first intermediate node and said output and a gate connected to said first AND input,
  a third P-channel transistor having a source-drain path connected between said first intermediate node and said output and a gate connected to said second AND input,
  a first N-channel transistor having a source-drain path connected between said output and a second intermediate node and a gate connected to said first AND input,
  a second N-channel transistor having a source-drain path connected between said second intermediate node and ground and a gate connected to said second AND input, and
  a third N-channel transistor having a source-drain path connected between said output and ground and a gate connected to said NOR input.

24. The carry look ahead circuit of claim 21, wherein:
said OR-NAND gate includes
  a first P-channel transistor having a source-drain path connected between a supply voltage and an first intermediate node and a gate connected to said second OR input,
  a second P-channel transistor having a source-drain path connected between said first intermediate node and said output and a gate connected to said first OR input,
  a third P-channel transistor having a source-drain path connected between the supply voltage and said output and a gate connected to said NAND input,
  a first N-channel transistor having a source-drain path connected between said output and a second intermediate node and a gate connected to said OR input,
  a second N-channel transistor having a source-drain path connected between said second intermediate node and ground and a gate connected to said first OR input, and a third N-channel transistor having a source-drain path connected between said second intermediate node and ground and a gate connected to said second OR input.

25. The carry look ahead circuit of claim 21, wherein:
said OR-NAND gate includes
a first P-channel transistor having a source-drain path connected between a supply voltage and an first intermediate node and a gate connected to said second OR input,
a second P-channel transistor having a source-drain path connected between said first intermediate node and said output and a gate connected to said first OR input,
a third P-channel transistor having a source-drain path connected between the supply voltage and said output and a gate connected to said NAND input,
a first N-channel transistor having a source-drain path connected between said output and a second intermediate node and a gate connected to said first OR input,
a second N-channel transistor having a source-drain path connected between said output and said second intermediate node and a gate connected to said second OR input, and
a third N-channel transistor having a source-drain path connected between said second intermediate node and ground and a gate connected to said NAND input.

26. A 6-bit carry look ahead circuit forming a combined propagate signal and a combined generated signal comprising:
a first NAND gate (120) having a first input receiving a propagate signal from the first bit, a second input receiving a propagate signal from the second bit and an output;
a second NAND gate (121) having a first input receiving a propagate signal from the third bit, a second input receiving a propagate signal from the fourth bit and an output;
a third NAND gate (122) having a first input receiving a propagate signal from the fifth bit, a second input receiving a propagate signal from the sixth bit and an output;
a NOR gate (123) having a first input connected to said output of said first NAND gate, a second input connected to said output of said second NAND gate and an output;
a first inverter (315) having an input connected to said output of said third NAND gate and an output;
a fourth NAND gate (124) having a first input connected to said output of said third NOR gate, a second input connected to said output of said first inverter and an output;
a second inverter (316) having an input connected to said output of said fourth NAND gate and an output generating the combined propagate signal for the six bits;
a first AND-NOR gate (215) having a first AND input receiving a generate signal from the first bit, a second AND input receiving a propagate signal from the second bit, a NOR input receiving a generate signal from the second bit and an output;
a second AND-NOR (216) gate having a first AND input receiving a propagate signal from the fourth bit, a second AND input receiving a generate signal from the third bit, a NOR input receiving a generate signal from the fourth bit and an output;
a first OR-NAND gate (256) having a first OR input connected to said output of said first AND-NOR gate, a second OR input connected to said output of said second NAND gate, a NAND input connected to said output of said second AND-NOR gate and an output;
a third inverter (312) having an input receiving a generate signal of the fifth bit and an output;

a fourth inverter (313) having an input connected receiving a propagate signal of the sixth bit and an output;
a fifth inverter (314) having an input receiving a generate signal of the sixth bit and an output;
a second OR-NOR gate (256) gate having a first OR input connected to said output of said third inverter, a second OR input connected to said output of said fourth inverter, a NAND input connected to said output of said fourth inverter and an output; and
a third AND-NOR gate (217) having a first AND input connected to said output of said first OR-NOR gate, a second AND input connected to said output of said second inverter, a NOR input and an output;
a sixth inverter (317) having an input connected to said output of said third AND-NOR gate and an output generating the combined generate signal for the six bits.

27. The carry look ahead circuit of claim 26, wherein:
said first, second and third AND-NOR gates include
a first P-channel transistor having a source-drain path connected between a supply voltage and an first intermediate node and a gate connected to said first AND input,
a second P-channel transistor having a source-drain path connected between a supply voltage and said first intermediate node and a gate connected to said second AND input,
a third P-channel transistor having a source-drain path connected between said first intermediate node and the output and a gate connected to said NOR input,
a first N-channel transistor having a source-drain path connected between said output and a second intermediate node and a gate connected to said first AND input,
a second N-channel transistor having a source-drain path connected between said second intermediate node and ground and a gate connected to said second AND input, and
a third N-channel transistor having a source-drain path connected between said output and ground and a gate connected to said NOR input.

28. The carry look ahead circuit of claim 26, wherein:
said first, second and third AND-NOR gates include
a first P-channel transistor having a source-drain path connected between a supply voltage and an first intermediate node and a gate connected to said NOR input,
a second P-channel transistor having a source-drain path connected between a supply voltage and said first intermediate node and said output and a gate connected to said first AND input,
a third P-channel transistor having a source-drain path connected between said first intermediate node and said output and a gate connected to said second AND input,
a first N-channel transistor having a source-drain path connected between said output and a second intermediate node and a gate connected to said first AND input,
a second N-channel transistor having a source-drain path connected between said second intermediate node and ground and a gate connected to said second AND input, and
a third N-channel transistor having a source-drain path connected between said output and ground and a gate connected to said NOR input.

29. The carry look ahead circuit of claim 26, wherein:
said first and second OR-NAND gates include
- a first P-channel transistor having a source-drain path connected between a supply voltage and an first intermediate node and a gate connected to said second OR input,
- a second P-channel transistor having a source-drain path connected between said first intermediate node and said output and a gate connected to said first OR input,
- a third P-channel transistor having a source-drain path connected between the supply voltage and said output and a gate connected to said NAND input,
- a first N-channel transistor having a source-drain path connected between said output and a second intermediate node and a gate connected to said OR input,
- a second N-channel transistor having a source-drain path connected between said second intermediate node and ground and a gate connected to said first OR input, and
- a third N-channel transistor having a source-drain path connected between said second intermediate node and ground and a gate connected to said second OR input.

30. The carry look ahead circuit of claim 26, wherein:
said first and second OR-NAND gate include
- a first P-channel transistor having a source-drain path connected between a supply voltage and an first intermediate node and a gate connected to said second OR input,
- a second P-channel transistor having a source-drain path connected between said first intermediate node and said output and a gate connected to said first OR input,
- a third P-channel transistor having a source-drain path connected between the supply voltage and said output and a gate connected to said NAND input,
- a first N-channel transistor having a source-drain path connected between said output and a second intermediate node and a gate connected to said first OR input,
- a second N-channel transistor having a source-drain path connected between said output and said second intermediate node and a gate connected to said second OR input, and
- a third N-channel transistor having a source-drain path connected between said second intermediate node and ground and a gate connected to said NAND input.

31. A 6-bit carry look ahead circuit forming a combined propagate signal and a combined generated signal comprising:
- a first NAND gate (125) having a first input receiving a propagate signal from the first bit, a second input receiving a propagate signal from the second bit and an output;
- a second NAND gate (126) having a first input receiving a propagate signal from the third bit, a second input receiving a propagate signal from the fourth bit and an output;
- a third NAND gate (127) having a first input receiving a propagate signal from the fifth bit, a second input receiving a propagate signal from the sixth bit and an output;
- a first NOR gate (128) having a first input connected to said output of said second NAND gate, a second input connected to said output of said third NAND gate and an output;
- a first inverter (319) having an input connected to said output of said first NOR gate and an output;
- a second NOR gate (129) having a first input connected to said output of said first NAND gate, a second input connected to said output of said first inverter and an output generating the combined propagate signal for the six bits;
- a first AND-NOR gate (218) having a first AND input receiving a propagate signal from the second bit, a second AND input receiving a generate signal from the first bit, a NOR input receiving a generate signal from the second bit and an output;
- a second inverter (318) having an input connected to said output of said first AND-NOR gate and an output;
- a second AND-NOR (219) gate having a first AND input receiving a propagate signal from the fourth bit, a second AND input receiving a generate signal from the third bit, a NOR input receiving a generate signal from the fourth bit and an output;
- a third AND-NOR (220) gate having a first AND input receiving a propagate signal from the sixth bit, a second AND input receiving a generate signal from the fifth bit, a NOR input receiving a generate signal from the sixth bit and an output;
- a OR-NAND gate (258) having a first OR input connected to said output of said second AND-NOR gate, a second OR input connected to said output of said third NAND gate, a NAND input connected to said output of said third AND-NOR gate and an output;
- a fourth AND-NOR gate (221) having a first AND input connected to said output of said first OR-NOR gate, a second AND input connected to said output of said first NOR gate, a NOR input and an output; and
- a third inverter (320) having an input connected to said output of said fourth AND-NOR gate and an output generating the combined generate signal for the six bits.

32. The carry look ahead circuit of claim 31, wherein:
said first, second, third and fourth AND-NOR gates include
- a first P-channel transistor having a source-drain path connected between a supply voltage and an first intermediate node and a gate connected to said first AND input,
- a second P-channel transistor having a source-drain path connected between a supply voltage and said first intermediate node and a gate connected to said second AND input,
- a third P-channel transistor having a source-drain path connected between said first intermediate node and the output and a gate connected to said NOR input,
- a first N-channel transistor having a source-drain path connected between said output and a second intermediate node and a gate connected to said first AND input,
- a second N-channel transistor having a source-drain path connected between said second intermediate node and ground and a gate connected to said second AND input, and
- a third N-channel transistor having a source-drain path connected between said output and ground and a gate connected to said NOR input.

33. The carry look ahead circuit of claim 31, wherein:
said first, second, third and fourth AND-NOR gates include
- a first P-channel transistor having a source-drain path connected between a supply voltage and an first intermediate node and a gate connected to said NOR input,
- a second P-channel transistor having a source-drain path connected between a supply voltage and said first intermediate node and said output and a gate connected to said first AND input, a third P-channel transistor having a source-drain path connected between said first intermediate node and said output and a gate connected to said second AND input, a first N-channel transistor having a source-drain path connected between said output and a second intermediate node and a gate connected to said first AND input, a second N-channel transistor having a source-drain path connected between said second intermediate node and ground and a gate connected to said second AND input, and a third N-channel transistor having a source-drain path connected between said output and ground and a gate connected to said NOR input.

34. The carry look ahead circuit of claim 31, wherein:

said OR-NAND gate includes a first P-channel transistor having a source-drain path connected between a supply voltage and an first intermediate node and a gate connected to said second OR input, a second P-channel transistor having a source-drain path connected between said first intermediate node and said output and a gate connected to said first OR input, a third P-channel transistor having a source-drain path connected between the supply voltage and said output and a gate connected to said NAND input, a first N-channel transistor having a source-drain path connected between said output and a second intermediate node and a gate connected to said OR input, a second N-channel transistor having a source-drain path connected between said second intermediate node and ground and a gate connected to said first OR input, and a third N-channel transistor having a source-drain path connected between said second intermediate node and ground and a gate connected to said second OR input.

35. The carry look ahead circuit of claim 31, wherein:

said OR-NAND gate includes a first P-channel transistor having a source-drain path connected between a supply voltage and an first intermediate node and a gate connected to said second OR input, a second P-channel transistor having a source-drain path connected between said first intermediate node and said output and a gate connected to said first OR input, a third P-channel transistor having a source-drain path connected between the supply voltage and said output and a gate connected to said NAND input, a first N-channel transistor having a source-drain path connected between said output and a second intermediate node and a gate connected to said first OR input, a second N-channel transistor having a source-drain path connected between said output and said second intermediate node and a gate connected to said second OR input, and a third N-channel transistor having a source-drain path connected between said second intermediate node and ground and a gate connected to said NAND input.

* * * * *